US012706778B2

(12) United States Patent
Zhang et al.

(10) Patent No.: US 12,706,778 B2
(45) Date of Patent: Aug. 11, 2026

(54) PACKET PROCESSING METHOD, APPARATUS, AND SYSTEM, AND STORAGE MEDIUM

(71) Applicant: HUAWEI TECHNOLOGIES CO., LTD., Shenzhen (CN)

(72) Inventors: Yawei Zhang, Beijing (CN); Jianwu Hao, Beijing (CN); Shuping Peng, Beijing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 916 days.

(21) Appl. No.: 17/972,686

(22) Filed: Oct. 25, 2022

(65) Prior Publication Data

US 2023/0131282 A1 Apr. 27, 2023

(30) Foreign Application Priority Data

Oct. 26, 2021 (CN) ......................... 202111250543.5
Jan. 11, 2022 (CN) ......................... 202210028914.3

(51) Int. Cl.
*H04L 12/46* (2006.01)
*H04L 45/76* (2022.01)

(52) U.S. Cl.
CPC .......... *H04L 12/4675* (2013.01); *H04L 45/76* (2022.05)

(58) Field of Classification Search
CPC ..... H04L 12/4675; H04L 45/76; H04L 45/74; H04L 45/745; H04L 49/354; H04L 12/4633; H04L 47/32; H04L 12/4641; H04W 88/14
See application file for complete search history.

(56) References Cited

U.S. PATENT DOCUMENTS

2017/0279717 A1 9/2017 Bethers et al.
2019/0266570 A1* 8/2019 Saito ....................... H04L 51/48
2019/0296966 A1* 9/2019 Gao ...................... H04L 45/247
2020/0177503 A1* 6/2020 Hooda ................ H04L 12/4641

FOREIGN PATENT DOCUMENTS

CN 112714071 * 10/2019
WO WO-2014077268 A1 * 5/2014 ......... H04L 47/2416
WO WO-2020134933 A1 * 7/2020 ............. H04L 41/12

OTHER PUBLICATIONS

Extended European Search Report issued in EP22202445.7, dated Jan. 17, 2023, 9 pages.

* cited by examiner

*Primary Examiner* — Sujoy K Kundu
*Assistant Examiner* — Raul Rivas

(57) ABSTRACT

A packet processing method is disclosed. According to the method, a first network device receives a first packet sent by a second network device, where the first packet includes a first group identifier corresponding to a VPN on the second network device, a first source device corresponding to the first packet belongs to the VPN, and the first source device is connected to the second network device. The first network device obtains a second group identifier based on a destination address of the first packet, where the second group identifier corresponds to the VPN on a third network device, a first destination device corresponding to the destination address of the first packet belongs to the VPN, and the first destination device is connected to the third network device. The first network device processes the first packet based on the first group identifier and the second group identifier.

19 Claims, 11 Drawing Sheets

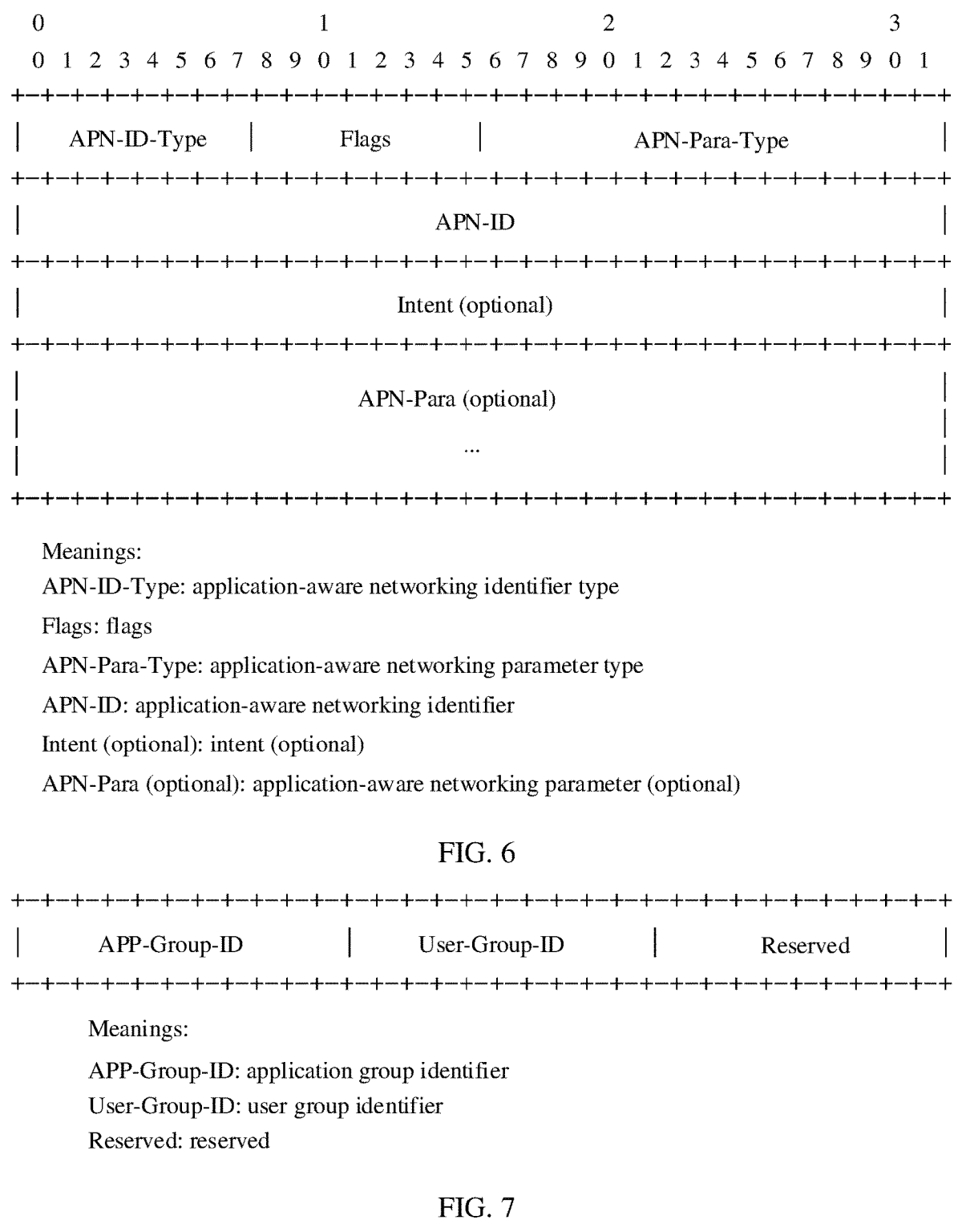

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  APN-ID-Type  |     Flags     |          APN-Para-Type        |
+-+-+-+-+-+-+-+-+-+-+-+-+-+-+-+-+-+-+-+-+-+-+-+-+-+-+-+-+-+-+-+-+
|                             APN-ID                            |
+-+-+-+-+-+-+-+-+-+-+-+-+-+-+-+-+-+-+-+-+-+-+-+-+-+-+-+-+-+-+-+-+
|                       Intent (optional)                       |
+-+-+-+-+-+-+-+-+-+-+-+-+-+-+-+-+-+-+-+-+-+-+-+-+-+-+-+-+-+-+-+-+
|                      APN-Para (optional)                      |
|                                                               |
|                              ...                              |
+-+-+-+-+-+-+-+-+-+-+-+-+-+-+-+-+-+-+-+-+-+-+-+-+-+-+-+-+-+-+-+-+
```

Meanings:

APN-ID-Type: application-aware networking identifier type

Flags: flags

APN-Para-Type: application-aware networking parameter type

APN-ID: application-aware networking identifier

Intent (optional): intent (optional)

APN-Para (optional): application-aware networking parameter (optional)

FIG. 6

```
+-+-+-+-+-+-+-+-+-+-+-+-+-+-+-+-+-+-+-+-+-+-+-+-+-+-+-+-+-+-+-+-+
|     APP-Group-ID     |     User-Group-ID     |     Reserved    |
+-+-+-+-+-+-+-+-+-+-+-+-+-+-+-+-+-+-+-+-+-+-+-+-+-+-+-+-+-+-+-+-+
```

Meanings:

APP-Group-ID: application group identifier

User-Group-ID: user group identifier

Reserved: reserved

FIG. 7

PACKET PROCESSING METHOD, APPARATUS, AND SYSTEM, AND STORAGE MEDIUM

CROSS-REFERENCE TO RELATED APPLICATIONS

This application claims priority to Chinese Patent Application No. 202111250543.5, filed on Oct. 26, 2021 and Chinese Patent Application No. 202210028914.3, filed on Jan. 11, 2022. Both of the aforementioned applications are hereby incorporated by reference in their entireties.

TECHNICAL FIELD

This application relates to the communication field, and in particular, to a packet processing method, apparatus, and system, and a storage medium.

BACKGROUND

A current virtual private network (VPN) may include a plurality of branches, and each branch is an access point for device access. For example, it is assumed that the VPN may include a first customer premises equipment (CPE), a second CPE, and a third CPE, each CPE represents one branch, and each CPE can be accessed by at least one customer edge device (CE).

Currently, CPEs belonging to the VPN are interconnected. However, based on actual requirements, some CPEs may need to be interconnected, and some CPEs may need to be isolated. For example, in the VPN, the first CPE and the second CPE may not be allowed to be interconnected, or the first CPE and the third CPE may be allowed to be interconnected. However, currently, a requirement of interconnection between some CPEs and isolation between some CPEs cannot be met.

SUMMARY

This application provides a packet processing method, apparatus, and system, and a storage medium, to meet a requirement of interconnection between some network devices and isolation between some network devices. Technical solutions are described as follows.

According to a first aspect, this application provides a packet processing method. In the method, a first network device receives a first packet sent by a second network device, where the first packet includes a first group identifier, the first group identifier corresponds to a virtual private network (VPN) on the second network device, a first source device corresponding to the first packet belongs to the VPN, and the first source device is connected to the second network device. The first network device obtains a second group identifier based on a destination address of the first packet, where the second group identifier corresponds to the VPN on a third network device, a first destination device corresponding to the destination address of the first packet belongs to the VPN, and the first destination device is connected to the third network device. The first network device processes the first packet based on the first group identifier and the second group identifier.

In the method, a group identifier corresponding to a CPE is carried in a packet on the CPE. For example, the first packet includes the first group identifier, and the first group identifier corresponds to the VPN on the second network device. Further, an interconnection policy between CPEs may be determined on a network PE based on the group identifier. For example, the first network device obtains the second group identifier based on the destination address of the first packet, and the second group identifier corresponds to the VPN on the third network device. In this way, the first network device processes the first packet based on the first group identifier and the second group identifier, for example, sends the first packet to the third network device or discards the first packet based on the first group identifier and the second group identifier, to connect the second network device to the third network device, or isolate the second network device from the third network device. In this way, a requirement of interconnection between some network devices and isolation between some networks is met.

In a possible implementation, the first network device obtains a first processing policy based on the first group identifier and the second group identifier. The first network device processes the first packet based on the first processing policy. In the method, the interconnection policy is configured on the network PE, and different processing policies are specified for different branches. Specifically, the first processing policy defines a manner of processing the first packet. For example, the second network device is connected to or isolated from the third network device by using the first processing policy.

In another possible implementation, the first network device obtains the first processing policy based on the first group identifier, the second group identifier, and a first correspondence. The interconnection policy may be configured based on the group identifier. Because the first correspondence includes the first group identifier, the second group identifier, and the first processing policy, the first processing policy is accurately obtained by using the first correspondence, and whether the second network device is connected to or isolated from the third network device can be accurately determined by using the first processing policy.

In another possible implementation, the first network device sends the first packet to the third network device when the first processing policy indicates that a transmission direction from the second network device to the third network device is connected. In this way, the transmission direction from the second network device to the third network device is connected by using the first processing policy.

In another possible implementation, the first network device discards the first packet when the first processing policy indicates that the transmission direction from the second network device to the third network device is isolated. In this way, the transmission direction from the second network device to the third network device is isolated by using the first processing policy.

In another possible implementation, the first processing policy further indicates that a transmission direction from the third network device to the second network device is connected, or the first processing policy further indicates that the transmission direction from the third network device to the second network device is isolated. In other words, the interconnection policy is a bidirectional policy. In this way, the first processing policy may indicate whether two transmission directions between the third network device and the second network device are isolated or connected, so that flexibility is improved.

In another possible implementation, the first network device obtains, based on the destination address of the first packet, routing information used to send the first packet, where the routing information includes an address of the third network device. The first network device obtains the second group identifier based on the address of the third network device, a network identifier of the VPN, and a second correspondence. The second correspondence includes the address of the third network device, the network identifier of the VPN, and the second group identifier, the first network device includes the routing information used to send the first packet, and the routing information includes the address of the third network device. In this way, the routing information in the first network device may be reused to obtain the second group identifier, so that algorithm implementation complexity is reduced.

In another possible implementation, the first group identifier is included in an internet protocol version 6 (IPv6) extension header of the first packet.

In another possible implementation, the first group identifier is included in an application-aware networking (APN) identifier of the IPv6 extension header. In this way, an APN model may be reused for the first group identifier, so that network deployment complexity is reduced.

In another possible implementation, the first network device receives a second packet sent by the second network device, where the second packet includes a third group identifier, the third group identifier corresponds to the VPN on the second network device, a second source device corresponding to the second packet belongs to the VPN, and the second source device is connected to the second network device. The first network device obtains a fourth group identifier based on a destination address of the second packet, where the fourth group identifier corresponds to the VPN on a fourth network device, a second destination device corresponding to the destination address of the second packet belongs to the VPN, and the second destination device is connected to the fourth network device. The first network device processes the second packet based on the third group identifier and the fourth group identifier. Processing the first packet includes sending the first packet to the third network device, and processing the second packet includes discarding the second packet. In other words, when the transmission direction from the second network device to the third network device is connected, a transmission direction from the second network device to the fourth network device is isolated, so that the requirement of interconnection between some network devices and isolation between some network devices is met.

In another possible implementation, the first network device includes a network-side edge device PE. The network PE corresponds to an area. For example, one province or one city usually corresponds to one network PE. In this way, interconnection or isolation between network devices is centrally implemented in one area.

In another possible implementation, the second network device includes a customer premises equipment (CPE) connected to the first source device, and the third network device includes a CPE connected to the first destination device.

According to a second aspect, this application provides a packet processing method. In the method, a second network device obtains a first packet, where the first packet includes a first group identifier, the first group identifier corresponds to a virtual private network (VPN) on the second network device, a first source device corresponding to the first packet belongs to the VPN, and the first source device is connected to the second network device. The second network device sends the first packet to a first network device.

In the method, a group identifier corresponding to a CPE is carried in a packet on the CPE. For example, the first packet includes the first group identifier, and the first group identifier corresponds to the VPN on the second network device. Further, an interconnection policy between CPEs may be determined on a network PE based on the group identifier. For example, after the second network device sends the first packet, the first network device that receives the first packet processes the first packet based on the first group identifier. For example, the first network device sends the first packet to a third network device or discards the first packet based on the first group identifier, to connect the second network device to the third network device, or isolate the second network device from the third network device. The third network device is a network device accessed by a first destination device corresponding to the first packet. In this way, a requirement of interconnection between some network devices and isolation between some networks is met.

In a possible implementation, the second network device obtains the first group identifier based on a network identifier of the VPN and a first correspondence. Because the first correspondence includes the network identifier of the VPN and the first group identifier, the first group identifier is accurately obtained by using the first correspondence.

In another possible implementation, the second network device includes a first interface bound to the VPN, and the first interface is connected to the first source device. The second network device receives, through the first interface, a third packet sent by the first source device. The second network device obtains the first packet based on the third packet, where the first packet includes the identifier of the VPN. In this way, the VPN may be determined by using the first interface, and then the first group identifier is obtained based on the VPN.

In another possible implementation, the second network device includes a customer premises equipment (CPE).

In another possible implementation, the first network device includes a network-side edge device PE. The network PE corresponds to an area. For example, one province or one city usually corresponds to one network PE. In this way, interconnection or isolation between network devices is centrally implemented in one area.

According to a third aspect, this application provides a packet processing apparatus. The apparatus includes a transceiver unit and a processing unit.

The transceiver unit is configured to receive a first packet sent by a second network device, where the first packet includes a first group identifier, the first group identifier corresponds to a virtual private network (VPN) on the second network device, a first source device corresponding to the first packet belongs to the VPN, and the first source device is connected to the second network device.

The processing unit is configured to obtain a second group identifier based on a destination address of the first packet, where the second group identifier corresponds to the VPN on a third network device, a first destination device corresponding to the destination address of the first packet belongs to the VPN, and the first destination device is connected to the third network device.

The processing unit is further configured to process the first packet based on the first group identifier and the second group identifier.

In the apparatus, a group identifier corresponding to a CPE is carried in a packet on the CPE. For example, the first packet includes the first group identifier, and the first group identifier corresponds to the VPN on the second network device. Further, an interconnection policy between CPEs may be determined on a network PE based on the group identifier. For example, the processing unit obtains the second group identifier based on the destination address of the first packet, and the second group identifier corresponds to the VPN on the third network device. In this way, the processing unit processes the first packet based on the first group identifier and the second group identifier, for example, sends the first packet to the third network device or discards the first packet based on the first group identifier and the second group identifier, to connect the second network device to the third network device, or isolate the second network device from the third network device. In this way, a requirement of interconnection between some network devices and isolation between some networks is met.

In a possible implementation, the processing unit is configured to obtain a first processing policy based on the first group identifier and the second group identifier. The processing unit is further configured to process the first packet based on the first processing policy. In the apparatus, the interconnection policy is configured on the apparatus, and different processing policies are specified for different branches. Specifically, the first processing policy defines a manner of processing the first packet. For example, the second network device is connected to or isolated from the third network device by using the first processing policy.

In another possible implementation, the processing unit is configured to obtain the first processing policy based on the first group identifier, the second group identifier, and a first correspondence. The interconnection policy may be configured based on the group identifier. Because the first correspondence includes the first group identifier, the second group identifier, and the first processing policy, the first processing policy is accurately obtained by using the first correspondence, and whether the second network device is connected to or isolated from the third network device can be accurately determined by using the first processing policy.

In another possible implementation, the transceiver unit is further configured to send the first packet to the third network device when the first processing policy indicates that a transmission direction from the second network device to the third network device is connected. In this way, the transmission direction from the second network device to the third network device is connected by using the first processing policy.

In another possible implementation, the processing unit is configured to discard the first packet when the first processing policy indicates that the transmission direction from the second network device to the third network device is isolated. In this way, the transmission direction from the second network device to the third network device is isolated by using the first processing policy.

In another possible implementation, the first processing policy further indicates that a transmission direction from the third network device to the second network device is connected, or the first processing policy further indicates that the transmission direction from the third network device to the second network device is isolated. In other words, the interconnection policy is a bidirectional policy. In this way, the first processing policy may indicate whether two transmission directions between the third network device and the second network device are isolated or connected, so that flexibility is improved.

In another possible implementation, the processing unit is configured to obtain, based on the destination address of the first packet, routing information used to send the first packet, where the routing information includes an address of the third network device. The processing unit is further configured to obtain the second group identifier based on the address of the third network device, a network identifier of the VPN, and a second correspondence. The second correspondence includes the address of the third network device, the network identifier of the VPN, and the second group identifier, the apparatus includes the routing information used to send the first packet, and the routing information includes the address of the third network device. In this way, the routing information in the apparatus may be reused to obtain the second group identifier, so that algorithm implementation complexity is reduced.

In another possible implementation, the first group identifier is included in an internet protocol version 6 (IPv6) extension header of the first packet.

In another possible implementation, the first group identifier is included in an application-aware networking (APN) identifier of the IPv6 extension header. In this way, an APN model may be reused for the first group identifier, so that network deployment complexity is reduced.

In another possible implementation, the transceiver unit is further configured to receive a second packet sent by the second network device, where the second packet includes a third group identifier, the third group identifier corresponds to the VPN on the second network device, a second source device corresponding to the second packet belongs to the VPN, and the second source device is connected to the second network device.

The processing unit is further configured to obtain a fourth group identifier based on a destination address of the second packet, where the fourth group identifier corresponds to the VPN on a fourth network device, a second destination device corresponding to the destination address of the second packet belongs to the VPN, and the second destination device is connected to the fourth network device.

The processing unit is further configured to process the second packet based on the third group identifier and the fourth group identifier.

Processing the first packet includes sending the first packet to the third network device, and processing the second packet includes discarding the second packet. In other words, when the transmission direction from the second network device to the third network device is connected, a transmission direction from the second network device to the fourth network device is isolated, so that the requirement of interconnection between some network devices and isolation between some network devices is met.

In another possible implementation, the apparatus includes a network-side edge device PE. The network PE corresponds to an area. For example, one province or one city usually corresponds to one network PE. In this way, interconnection or isolation between network devices is centrally implemented in one area.

In another possible implementation, the second network device includes a customer premises equipment (CPE) connected to the first source device, and the third network device includes a CPE connected to the first destination device.

According to a fourth aspect, this application provides a packet processing apparatus. The apparatus includes a processing unit and a transceiver unit.

The processing unit is configured to obtain a first packet, where the first packet includes a first group identifier, the first group identifier corresponds to a virtual private network (VPN) on the apparatus, a first source device corresponding to the first packet belongs to the VPN, and the first source device is connected to the apparatus.

The transceiver unit is configured to send the first packet to a first network device.

In the apparatus, a group identifier corresponding to a CPE is carried in a packet on the CPE. For example, the first packet includes the first group identifier, and the first group identifier corresponds to the VPN on the apparatus. Further, an interconnection policy between CPEs may be determined on a network PE based on the group identifier. For example, after the transceiver unit sends the first packet, the first network device that receives the first packet processes the first packet based on the first group identifier. For example, the first network device sends the first packet to a third network device or discards the first packet based on the first group identifier, to connect the apparatus to the third network device, or isolate the apparatus from the third network device. The third network device is a network device accessed by a first destination device corresponding to the first packet. In this way, a requirement of interconnection between some network devices and isolation between some networks is met.

In a possible implementation, the processing unit is configured to obtain the first group identifier based on a network identifier of the VPN and a first correspondence. Because the first correspondence includes the network identifier of the VPN and the first group identifier, the first group identifier is accurately obtained by using the first correspondence.

In another possible implementation, the apparatus includes a first interface bound to the VPN, and the first interface is connected to the first source device. The transceiver unit is further configured to receive, through the first interface, a third packet sent by the first source device.

The processing unit is further configured to obtain the first packet based on the third packet, where the first packet includes the identifier of the VPN.

In this way, the VPN may be determined by using the first interface, and then the first group identifier is obtained based on the VPN.

In another possible implementation, the apparatus includes a customer premises equipment (CPE).

In another possible implementation, the first network device includes a network-side edge device PE. The network PE corresponds to an area. For example, one province or one city usually corresponds to one network PE. In this way, interconnection or isolation between network devices is centrally implemented in one area.

According to a fifth aspect, this application provides a packet processing apparatus. The apparatus includes a processor and a memory. The processor and the memory may be connected through an internal connection. The memory is configured to store a program, and the processor is configured to execute the program in the memory, to enable the apparatus to complete the method according to any one of the first aspect or the possible implementations of the first aspect.

According to a sixth aspect, this application provides a packet processing apparatus. The apparatus includes a processor and a memory. The processor and the memory may be connected through an internal connection. The memory is configured to store a program, and the processor is configured to execute the program in the memory, to enable the apparatus to complete the method according to any one of the second aspect or the possible implementations of the second aspect.

According to a seventh aspect, this application provides a network device. The network device includes a main control board and an interface board. The main control board includes a first processor and a first memory. The interface board includes a second processor, a second memory, and an interface card. The main control board is coupled to the interface board.

The first memory may be configured to store program code, and the first processor is configured to invoke the program code in the first memory to perform the following operation: receiving a first packet sent by a second network device, where the first packet includes a first group identifier, the first group identifier corresponds to a virtual private network (VPN) on the second network device, a first source device corresponding to the first packet belongs to the VPN, and the first source device is connected to the second network device.

The second memory may be configured to store program code, and the second processor is configured to invoke the program code in the second memory to trigger the interface card to perform the following operation: obtaining a second group identifier based on a destination address of the first packet, where the second group identifier corresponds to the VPN on a third network device, a first destination device corresponding to the destination address of the first packet belongs to the VPN, and the first destination device is connected to the third network device. The first packet is processed based on the first group identifier and the second group identifier.

In a possible implementation, an inter-process communication (IPC) channel is established between the main control board and the interface board, and the main control board and the interface board communicate with each other through the IPC channel.

According to an eighth aspect, this application provides a network device. The network device includes a main control board and an interface board. The main control board includes a first processor and a first memory. The interface board includes a second processor, a second memory, and an interface card. The main control board is coupled to the interface board.

The first memory may be configured to store program code, and the first processor is configured to invoke the program code in the first memory to perform the following operation: obtaining a first packet, where the first packet includes a first group identifier, the first group identifier corresponds to a virtual private network (VPN) on the network device, a first source device corresponding to the first packet belongs to the VPN, and the first source device is connected to the network device.

The second memory may be configured to store program code, and the second processor is configured to invoke the program code in the second memory to trigger the interface card to perform the following operation: sending the first packet to a first network device.

In a possible implementation, an inter-process communication (IPC) channel is established between the main control board and the interface board, and the main control board and the interface board communicate with each other through the IPC channel.

According to a ninth aspect, this application provides a packet processing system. The system includes the apparatus provided in the third aspect and the apparatus provided in the fourth aspect, the system includes the apparatus provided in the fifth aspect and the apparatus provided in the sixth aspect, or the system includes the network device provided in the seventh aspect and the network device provided in the eighth aspect.

According to a tenth aspect, this application provides a computer program product. The computer program product includes a computer program stored in a computer-readable storage medium, and the computer program is loaded by a processor to implement the method according to any one of the first aspect, the second aspect, the possible implementations of the first aspect, or the possible implementations of the second aspect.

According to an eleventh aspect, this application provides a computer-readable storage medium, configured to store a computer program. The computer program is loaded by a processor to perform the method according to any one of the first aspect, the second aspect, the possible implementations of the first aspect, or the possible implementations of the second aspect.

According to a twelfth aspect, this application provides a chip, including a memory and a processor. The memory is configured to store computer instructions, and the processor is configured to invoke the computer instructions from the memory and run the computer instructions, to perform the method according to any one of the first aspect, the second aspect, the possible implementations of the first aspect, or the possible implementations of the second aspect.

BRIEF DESCRIPTION OF DRAWINGS

FIG. 6 is a schematic diagram of an application-aware networking (APN) header according to an embodiment of this application;

FIG. 7 is a schematic diagram of an APN identifier (APN-ID) according to an embodiment of this application;

DETAILED DESCRIPTION OF EMBODIMENTS

Figure 1:
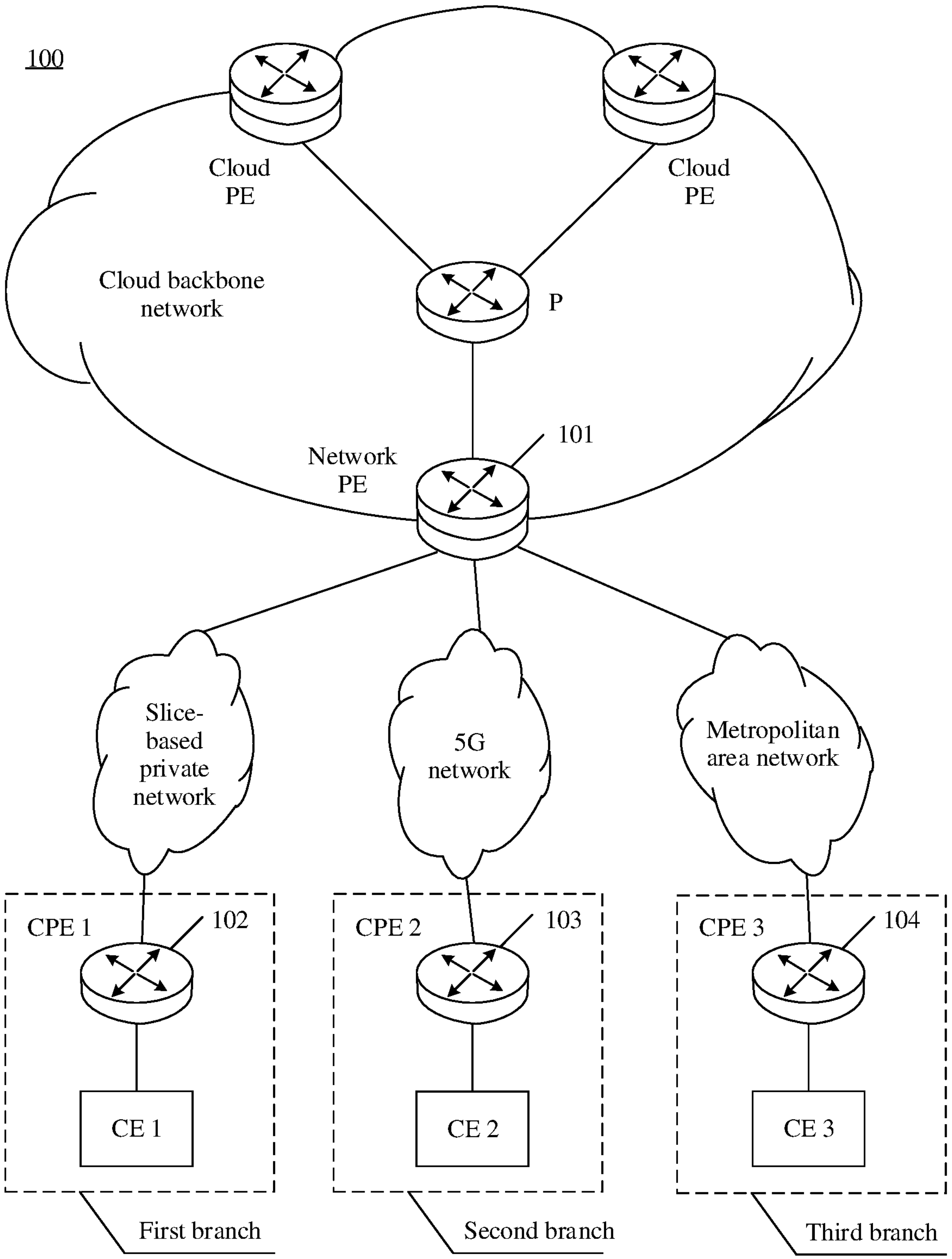
FIG. 1 is a schematic diagram of a network architecture according to an embodiment of this application.

The following further describes in detail embodiments of this application with reference to the accompanying drawings.

A VPN is a private network established on a public network. The VPN may be used for encrypted communication and is widely applied to enterprise networks. For example, department networks of different departments in an enterprise communicate with each other over a public network through a VPN, so that the department networks of the different departments form an interconnected private enterprise network. For another example, networks of different branch offices of an enterprise communicate with each other over a public network through a VPN, so that the networks of the different branch offices form an interconnected private enterprise network.

In some embodiments, the VPN includes an Ethernet virtual private network (EVPN) and the like. For example, the EVPN may further include a hierarchy of VPN (HoVPN) and the like.

The VPN may include a plurality of branches, and different branches may need to be interconnected or isolated. For example, the department networks of the different departments in the enterprise are different branches of the VPN, and the department networks of the different departments in the enterprise may need to be interconnected or isolated. For example, a research and development department in the enterprise may require confidentiality. Therefore, a department network of the research and development department needs to be isolated, so that the department network of the research and development department cannot send data to a department network of another department. However, the department network of the research and development department may still be able to receive data sent by the department network of the another department, or may not be able to receive the data sent by the department network of the another department. Department networks of other departments in the enterprise may be allowed to communicate with each other because these networks do not require confidentiality. For another example, the networks of the different branch offices may be different branches, and the networks of the different branch offices may need to be connected or isolated.

Each branch of the VPN includes a network device. For the network device of each branch, the network device can be accessed by a terminal device in the branch, and the network device is an access point. The network device is connected to a communication network, and the communication network is a public network. In this way, terminal devices in different branches communicate with each other through the VPN. For example, with reference to FIG. 1, this application provides a network architecture 100 of a VPN. The network architecture 100 includes:

network devices such as a first network device 101, a second network device 102, a third network device 103, and a fourth network device 104, where the second network device 102, the third network device 103, and the fourth network device 104 separately communicate with the first network device 101. The second network device 102, the third network device 103, and the fourth network device 104 are located at edges of a communication network, and the first network device 101 can forward data between the second network device 102, the third network device 103, and the fourth network device 104.

The second network device 102, the third network device 103, and the fourth network device 104 belong to a first branch, a second branch, and a third branch of the VPN respectively. A terminal device in the first branch accesses the second network device 102, a terminal device in the second branch accesses the third network device 103, and a terminal device in the third branch accesses the fourth network device 104.

In some embodiments, for any network device in the second network device 102, the third network device 103, and the fourth network device 104, the network device communicates with the first network device 101 through a slice-based private network, a cellular mobile communication network, an IP radio access network (IPRAN), or a metropolitan area network. The cellular mobile communication network includes a 5G network, a 4G network, a 3G network, or the like.

In some embodiments, with reference to FIG. 1, the first network device 101 includes a network-side edge device (provider edge, PE) or the like located in a cloud backbone network, and the network-side edge device may also be referred to as a network PE. For example, the first network device 101 is a network PE. The second network device 102 is a CPE or the like located at an edge of the communication network, the third network device 103 is a CPE or the like located at an edge of the communication network, and/or the fourth network device 104 is a CPE or the like located at an edge of the communication network.

In some embodiments, in addition to the network PE, the cloud backbone network may further include network devices such as one or more routing devices P and one or more cloud Pes. The network PE communicates with these routing devices P and/or these cloud Pes.

For example, with reference to FIG. 1, the second network device 102, the third network device 103, and the fourth network device 104 are respectively three different CPEs (which are a CPE 1, a CPE 2, and a CPE 3). The second network device 102 communicates with the first network device 101 through the slice-based private network, the third network device 103 communicates with the first network device 101 through the 5G network, and the fourth network device 104 communicates with the first network device 101 through the metropolitan area network. The terminal device accessing the second network device 102, the terminal device accessing the third network device 103, or the terminal device accessing the fourth network device 104 includes a CE.

In some embodiments, the second network device 102 includes at least one interface, and the terminal device accessing the second network device 102 is connected to an interface on the second network device 102. An interface on the second network device 102 is bound to the VPN. Optionally, different interfaces on the second network device 102 may be bound to different VPNs, or may be bound to a same VPN.

In some embodiments, the second network device 102 includes an interface binding correspondence, where the interface binding correspondence is used to store a correspondence between an interface identifier of an interface and a network identifier of a VPN. Each record in the interface binding correspondence includes an interface identifier of one interface on the second network device 102 and a network identifier of a VPN bound to the interface. This record indicates that the interface is bound to the VPN.

For example, the second network device 102 includes an interface binding correspondence shown in Table 1. The first record in the interface binding correspondence includes an interface identifier 1 of a first interface and a network identifier 1 of a VPN 1, and the first record indicates that the first interface on the second network device 102 is bound to the VPN 1. The second record in the interface binding correspondence includes an interface identifier 2 of a second interface and a network identifier 2 of a VPN 2, and the second record indicates that the second interface on the second network device 102 is bound to the VPN 2.

TABLE 1

| Sequence number | Interface identifier | Network identifier |
|---|---|---|
| 1 | Interface identifier 1 of the first interface | Network identifier 1 of the VPN 1 |
| 2 | Interface identifier 2 of the second interface | Network identifier 2 of the VPN 2 |

For a same VPN, the VPN may be bound to interfaces on different network devices. The VPN 1 is used as an example, and the VPN 1 is bound to the first interface on the second network device 102. For example, if the VPN 1 is further deployed on the third network device 103 and the fourth network device 104, an interface bound to the VPN 1 also exists on the third network device 103, and an interface bound to the VPN 1 also exists on the fourth network device 104.

Similarly, the third network device 103 and the fourth network device 104 also include interface binding correspondences. Meanings of the interface binding correspondences included in the third network device 103 and the fourth network device 104 are not described in detail herein.

Different branches belonging to the VPN may need to be isolated or interconnected, or some branches need to be isolated and some branches need to be interconnected. The following several scenarios may exist between these different branches, and the several scenarios are separately as follows.

Scenario 1: The branches belonging to the VPN are interconnected and do not need to be isolated.

Figure 2:
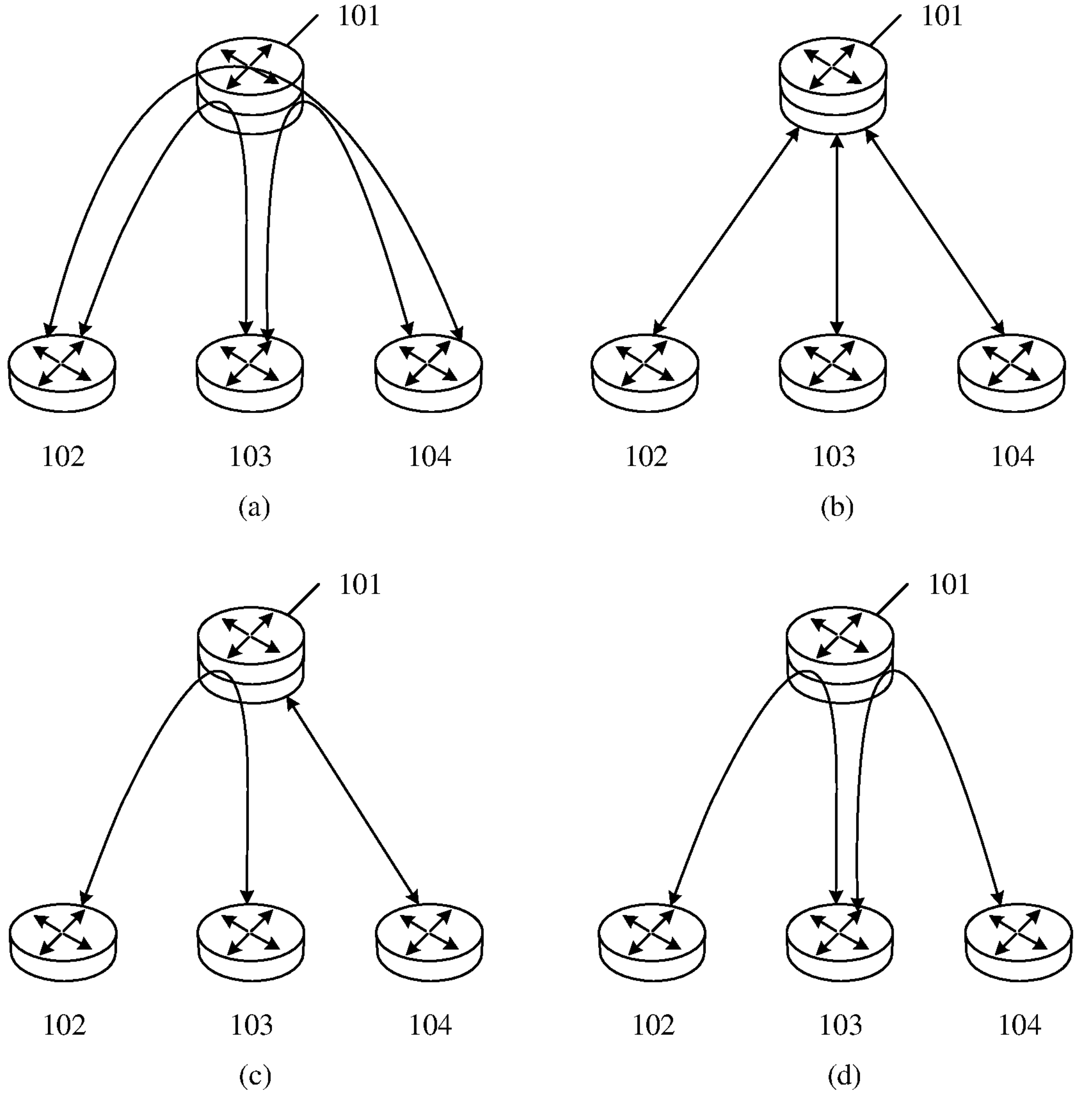
FIG. 2 is a schematic diagram of a scenario according to an embodiment of this application.

For example, with reference to FIG. 2(*a*), the first branch, the second branch, and the third branch are interconnected, and do not need to be isolated. To be specific, any two of the second network device 102 in the first branch, the third network device 103 in the second branch, and the fourth network device 104 in the third branch are interconnected. In other words, the second network device 102 and the third network device 103 communicate with each other, the third network device 103 and the fourth network device 104 communicate with each other, and the second network device 102 and the fourth network device 104 communicate with each other.

Scenario 2: The branches belonging to the VPN are all isolated, and the branches are not interconnected.

For example, with reference to FIG. 2(*b*), the first branch, the second branch, and the third branch are isolated from each other. To be specific, the second network device 102 in the first branch, the third network device 103 in the second branch, and the fourth network device 104 in the third branch are isolated from each other. In other words, the second network device 102 and the third network device 103 are isolated, the third network device 103 and the fourth network device 104 are isolated, and the second network device 102 and the fourth network device 104 are isolated.

Scenario 3: All branches belonging to the VPN are divided into two parts. The two parts include a first part of branches and a second part of branches. The first part of branches is interconnected, and each branch in the second part is isolated from each branch in the first part. In other words, in all the branches, some branches are isolated and some branches are interconnected.

For example, with reference to FIG. 2(*c*), the second network device 102 in the first branch and the third network device 103 in the second branch are interconnected. However, the fourth network device 104 in the third branch is isolated from the second network device 102 in the first branch and the third network device 103 in the second branch. In other words, the first branch and the second branch belong to the first part of branches, and the third branch belongs to the second part of branches. The second network device 102 and the third network device 103 are interconnected, the third network device 103 and the fourth network device 104 are isolated, and the second network device 102 and the fourth network device 104 are isolated.

Scenario 4: In all the branches belonging to the VPN, some branches are crossly interconnected, and some branches are isolated.

For example, with reference to FIG. 2(*d*), the second network device 102 in the first branch and the third network device 103 in the second branch are interconnected, and the third network device 103 in the second branch and the fourth network device 104 in the third branch are interconnected. However, the second network device 102 in the first branch and the fourth network device 104 in the third branch are isolated. In other words, the second network device 102 and the third network device 103 are interconnected, the third network device 103 and the fourth network device 104 are interconnected, and the second network device 102 and the fourth network device 104 are isolated.

In all the branches belonging to the VPN, all the branches may need to be isolated, or all the branches may need to be interconnected, or some branches may need to be isolated and some branches may need to be interconnected. That some branches are isolated and some branches are interconnected means that some network devices are isolated and some network devices are interconnected. However, a current problem is that isolation between some network devices and interconnection between some network devices cannot be implemented. To resolve this problem, the following manners may be used.

Access control lists (ACLs) may be used to implement isolation between some network devices and interconnection between some network devices. With reference to FIG. 2(*c*), the second network device 102 and the third network device 103 are interconnected, and the second network device 102 and the fourth network device 104 are isolated. A first ACL is configured on the second network device 102. Each record in the first ACL includes a first address, a second address, and a policy. It is assumed that the first ACL includes a first record and a second record, a first address in the first record is an address of a CE 1 that accesses the second network device 102, a second address in the first record is an address of a CE 2 that accesses the third network device 103, and a first policy in the first record is interconnection. A first address in the second record is the address of the CE 1 that accesses the second network device 102, a second address in the second record is an address of a CE 3 that accesses the fourth network device 104, and a second policy in the second record is isolation.

In this case, if the CE 1 sends a first packet to the CE 2, the second network device 102 receives the first packet, uses a source address (the address of the CE 1) in the first packet as a first address, and uses a destination address (the address of the CE 2) in the first packet as a second address. The second network device 102 obtains the first policy in the first record from the first ACL based on the first address and the second address (where the first policy is interconnection), and sends the first packet to the third network device 103. Then, the third network device 103 forwards the first packet to the CE 2. If the CE 1 sends a second packet to the CE 3, the second network device 102 receives the second packet, uses a source address (the address of the CE 1) in the second packet as a first address, and uses a destination address (the address of the CE 3) in the second packet as a second address. The second network device 102 obtains the second policy in the second record from the first ACL based on the first address and the second address (where the second policy is isolation), and discards the second packet.

Similarly, the third network device 103 includes a second ACL. Each record in the second ACL includes a first address, a second address, and a policy. It is assumed that the second ACL includes a third record, a first address in the third record is the address of the CE 2 that accesses the third network device 103, a second address in the third record is the address of the CE 1 that accesses the second network device 102, and a third policy in the third record is interconnection. The fourth network device 104 includes a third ACL. Each record in the third ACL includes a first address, a second address, and a policy. It is assumed that the third ACL includes a fourth record, a first address in the fourth record is the address of the CE 3 that accesses the fourth network device 104, a second address in the fourth record is the address of the CE 1 that accesses the second network device 102, and a fourth policy in the fourth record is isolation. In this way, the CE 1 that accesses the second network device 102 and the CE 2 that accesses the third network device 103 are interconnected, and the CE 1 that accesses the second network device 102 and the CE 3 that accesses the fourth network device 104 are isolated.

If a new network device is added, content needs to be added to the ACL of the existing network device, so that the new network device can be connected to or isolated from the existing network device. For example, a fifth network device is newly added. If the fifth network device is connected to the second network device 102, and is isolated from the third network device 103 and the fourth network device 104, a fifth record is configured in the first ACL of the second network device 102, where a first address included in the fifth record is the address of the CE 1 that accesses the second network device 102, a second address included in the fifth record is an address of a CE 4 that accesses the fifth network device, and a fifth policy included in the fifth record is interconnection. Similarly, a sixth record also needs to be configured in the second ACL of the third network device 103, and a seventh record also needs to be configured in the third ACL of the fourth network device 104. Therefore, when the new network device is added, configuration needs to be performed on the existing network device. Consequently, a large quantity of devices needs to be configured, and configuration efficiency is low.

A route target (RT) planning manner may be used to implement isolation between some network devices and interconnection between some network devices. For two network devices that need to be interconnected, routing information corresponding to the two network devices is configured on the first network device. The routing information is used to forward data between the two network devices, and the routing information is end-to-end routing information. For two network devices that need to be isolated, routing information corresponding to the two network devices is not configured on the first network device.

For example, with reference to FIG. 2(*c*), the second network device 102 and the third network device 103 are connected, and the second network device 102 and the fourth network device 104 are isolated. Routing information corresponding to the second network device 102 and the third network device 103 is configured on the first network device 101, and routing information corresponding to the second network device 102 and the fourth network device 104 is not configured on the first network device 101. In this way, if the first network device 101 receives a packet sent by the second network device 102 to the third network device 103, the first network device 101 obtains the routing information corresponding to the second network device 102 and the third network device 103, and forwards the packet to the third network device 103 based on the routing information, so that the second network device 102 is connected to the third network device 103. If the first network device 101 receives a packet sent by the second network device 102 to the fourth network device 104, because the first network device 101 cannot obtain the routing information corresponding to the second network device 102 and the fourth network device 104, the first network device 101 discards the packet, so that the second network device 102 is isolated from the fourth network device 104.

The routing information configured on the first network device 101 in the RT planning manner is end-to-end routing information. When the VPN is an HoVPN, because the HoVPN is a hierarchical VPN model, the end-to-end routing information cannot be configured on the first network device 101. In this case, the RT planning manner cannot be used to implement isolation between some network devices and interconnection between some network devices.

A default routing manner may also be used, but the default routing manner can only be used to configure interconnection between network devices. To be specific, default routing information between network devices is configured on the first network device. In this way, when the first network device receives a packet sent by any network device to another network device, the first network device obtains default routing information corresponding to the network device and the another network device, and sends the packet to the another network device based on the default routing information. Therefore, the default routing manner may be used to implement interconnection between network devices. However, the manner cannot be used to implement interconnection between some network devices and isolation between some network devices.

To meet this requirement, a group identifier may be configured on a network device of each branch. For the group identifier on the network device of each branch, the group identifier corresponds to the VPN on the network device, a device group identified by the group identifier includes the network device and at least one terminal device accessing the network device, and the at least one terminal device is a terminal device belonging to the VPN. The requirement is implemented by using the group identifier, and a detailed implementation process is described in detail in a subsequent embodiment.

In some embodiments, the group identifier that is on the network device and that corresponds to the VPN is configured by a network management system. For any two network devices belonging to the VPN, two group identifiers corresponding to the VPN on the two network devices may be the same or different.

The VPN 1 is still used as an example. The second network device 102 includes a group identifier 1 corresponding to the VPN 1, the third network device 103 includes a group identifier 2 corresponding to the VPN 1, and the fourth network device 104 includes a group identifier 3 corresponding to the VPN 1. When the group identifier 1 is the same as the group identifier 2, it indicates that a transmission direction from the second network device 102 to the third network device 103 is connected or isolated, and/or indicates that a transmission direction from the third network device 103 to the second network device 102 is connected or isolated. Alternatively, when the group identifier 1 is different from the group identifier 2, it indicates that a transmission direction from the second network device 102 to the third network device 103 is connected or isolated, and/or indicates that a transmission direction from the third network device 103 to the second network device 102 is connected or isolated. Meanings of whether the group identifier 1 and the group identifier 3 are the same and whether the group identifier 2 and the group identifier 3 are the same are not enumerated one by one.

In some embodiments, the second network device 102 includes a first group-network correspondence, where the first group-network correspondence is used to store a correspondence between a network identifier of a VPN and a group identifier. Alternatively, the second network device 102 includes a second group-network correspondence, where the second group-network correspondence is used to store a correspondence between a network identifier of a VPN, a group identifier, and an address.

Each record in the first group-network correspondence includes a network identifier of one VPN and a group identifier corresponding to the VPN on the second network device 102. Optionally, the group identifier is used to identify a device group, and the device group includes the second network device 102 and the terminal device that accesses the second network device 102 and belongs to the VPN.

For example, the second network device 102 includes a first group-network correspondence shown in Table 2. The first record in the first group-network correspondence includes the network identifier 1 of the VPN 1 and the group identifier 1 corresponding to the VPN 1 on the second network device 102. The second record in the first group-network correspondence includes the network identifier 2 of the VPN 2 and a group identifier 4 corresponding to the VPN 2 on the second network device 102.

TABLE 2

| Sequence number | Network identifier | Group identifier |
|---|---|---|
| 1 | Network identifier 1 of the VPN 1 | Group identifier 1 |
| 2 | Network identifier 2 of the VPN 2 | Group identifier 4 |

Each record in the second group-network correspondence includes a network identifier of one VPN, a group identifier corresponding to the VPN on the second network device 102, and an address. The address may include an address of the terminal device accessing the second network device 102 and/or an address of a terminal device in another branch belonging to the VPN. The another branch is a branch other than a branch in which the second network device 102 is located, in other words, the another branch is a branch other than the first branch. Optionally, the address includes a source address and/or a destination address of a packet sent by the second network device 102.

In some embodiments, when the address includes the address of the terminal device in the another branch belonging to the VPN, for at least one record that includes a same group identifier in the second group-network correspondence, the group identifier is used to identify a first device group and a second device group. The first device group includes the second network device 102 and a device that accesses the second network device 102 and belongs to the VPN. The second device group includes a device corresponding to an address in each of the at least one record. The device in the second device group belongs to the VPN and is a device in the another branch. The group identifier is used to control whether the device in the first device group and the device in the second device group are interconnected or isolated.

For example, the second network device 102 includes a second group-network correspondence shown in Table 3. The first record in the second group-network correspondence includes the network identifier 1 of the VPN 1, the group identifier 1 corresponding to the VPN 1 on the second network device 102, and an address IP-CE2, where the address IP-CE2 is the address of the CE 2 in the second branch. The group identifier 1 in the first record is used to identify a first device group and a second device group. The first device group includes the second network device 102 and a device that accesses the second network device 102 and belongs to the VPN 1. To be specific, the first device group includes the second network device 102 and the CE 1 that accesses the second network device 102 and belongs to the VPN 1. In other words, the device in the first device group belongs to the VPN 1 and is a device in the first branch.

The second device group includes the third network device 103 and a device that accesses the third network device 103 and belongs to the VPN 1. To be specific, the second device group includes the third network device 103 and the CE 2 that accesses the third network device 103 and belongs to the VPN 1. In other words, the device in the second device group belongs to the VPN 1 and is a device in the second branch. The group identifier 1 is used to control whether the second network device 102 and the CE 1 in the first device group are connected to or isolated from the third network device 103 and the CE 2 in the second device group.

The second record in the second group-network correspondence shown in Table 3 includes the network identifier 2 of the VPN 2, the group identifier 4 corresponding to the VPN 2 on the second network device 102, and an address IP-CE3, where the address IP-CE3 is the address of the CE 3 in the third branch.

TABLE 3

| Sequence number | Network identifier | Group identifier | Address |
|---|---|---|---|
| 1 | Network identifier 1 of the VPN 1 | Group identifier 1 | IP-CE2 |
| 2 | Network identifier 2 of the VPN 2 | Group identifier 4 | IP-CE3 |

Similarly, the third network device 103 and the fourth network device 104 also include first group-network correspondences or second group-network correspondences. Meanings of the first group-network correspondences or the second group-network correspondences included in the third network device 103 and the fourth network device 104 are not described in detail herein.

In some embodiments, the first network device 101 includes a third group-network correspondence, and the third group-network correspondence is used to store a correspondence between a network identifier, an address, and a group identifier. Each record in the third group-network correspondence includes a network identifier of one VPN, an address of a network device, and a group identifier corresponding to the VPN on the network device. Optionally, the network device is a network device at an edge of a communication network, for example, a CPE.

Refer to FIG. 1. The VPN 1 is still used as an example. The first record in a third group-network correspondence shown in the following Table 4 includes the network identifier 1 of the VPN 1, an address IP-CPE1 of the second network device 102, and the group identifier 1 corresponding to the VPN 1 on the second network device 102. The second record in the third group-network correspondence includes the network identifier 1 of the VPN 1, an address IP-CPE2 of the third network device 103, and the group identifier 2 corresponding to the VPN 1 on the third network device 103. The third record in the third group-network correspondence includes the network identifier 1 of the VPN 1, an address IP-CPE3 of the fourth network device 104, and the group identifier 3 corresponding to the VPN 1 on the fourth network device 104.

TABLE 4

| Sequence number | Network identifier | Address | Group identifier |
|---|---|---|---|
| 1 | Network identifier 1 of the VPN 1 | IP-CPE1 | Group identifier 1 |
| 2 | Network identifier 1 of the VPN 1 | IP-CPE2 | Group identifier 2 |
| 3 | Network identifier 1 of the VPN 1 | IP-CPE3 | Group identifier 3 |
| . . . | . . . | . . . | . . . |

In some embodiments, the first network device 101 further includes a group-policy correspondence, and the group-policy correspondence is used to store a correspondence between a first group identifier, a second group identifier, and a processing policy. Each record in the group-policy correspondence includes a first group identifier, a second group identifier, and one processing policy, and the first group identifier and the second group identifier are group identifiers that are on two network devices and that correspond to a same VPN.

For example, the first network device 101 includes a group-policy correspondence shown in the following Table 5. The first record in the group-policy correspondence includes the group identifier 1, the group identifier 2, and a processing policy 1. The group identifier 1 corresponds to the VPN 1 on the second network device 102, the group identifier 2 corresponds to the VPN 1 on the third network device 103, and the processing policy 1 indicates that the transmission direction from the second network device 102 to the third network device 103 is connected or isolated. Optionally, the processing policy 1 further indicates that the transmission direction from the third network device 103 to the second network device 102 is connected or isolated.

The second record in the group-policy correspondence includes the group identifier 1, the group identifier 3, and a processing policy 2. The group identifier 3 corresponds to the VPN 1 on the fourth network device 104, and the processing policy 2 indicates that a transmission direction from the second network device 102 to the fourth network device 104 is connected or isolated. Optionally, the processing policy 2 further indicates that a transmission direction from the fourth network device 104 to the second network device 102 is connected or isolated.

The third record in the group-policy correspondence includes the group identifier 2, the group identifier 3, and a processing policy 3. The processing policy 3 indicates that a transmission direction from the third network device 103 to the fourth network device 104 is connected or isolated. Optionally, the processing policy 3 further indicates that a transmission direction from the fourth network device 104 to the third network device 103 is connected or isolated.

TABLE 5

| Sequence number | First group identifier | Second group identifier | Processing policy |
|---|---|---|---|
| 1 | Group identifier 1 | Group identifier 2 | Processing policy 1 |
| 2 | Group identifier 1 | Group identifier 3 | Processing policy 2 |
| 3 | Group identifier 2 | Group identifier 3 | Processing policy 3 |
| . . . | . . . | . . . | . . . |

The processing policy may indicate whether two transmission directions between two network devices are isolated or connected, so that flexibility is improved.

In some embodiments, the first network device 101 further includes a routing table. The routing table includes at least one piece of routing information. For each piece of routing information, the routing information includes a destination address and an address of a next-hop device. The next-hop device is a network device located at an edge of the communication network. For example, the next-hop device is a CPE. A device corresponding to the destination address accesses the next-hop device. The routing information is used to indicate the first network device 101 to send a packet to the next-hop device. A destination address of the packet is the destination address in the routing information. In this way, the next-hop device forwards the packet to the destination device corresponding to the destination address. For example, it is assumed that the routing information includes IP-CE2 and IP-CPE2, where IP-CE2 is the destination address, and IP-CPE2 is the address of the next-hop device. The routing information is used to indicate the first network device 101 to send a packet to the third network device 103 corresponding to IP-CPE2, where the packet is a packet that needs to be sent to the CE 2. The third network device 103 receives the packet, and forwards the packet to the CE 2.

Figure 3:
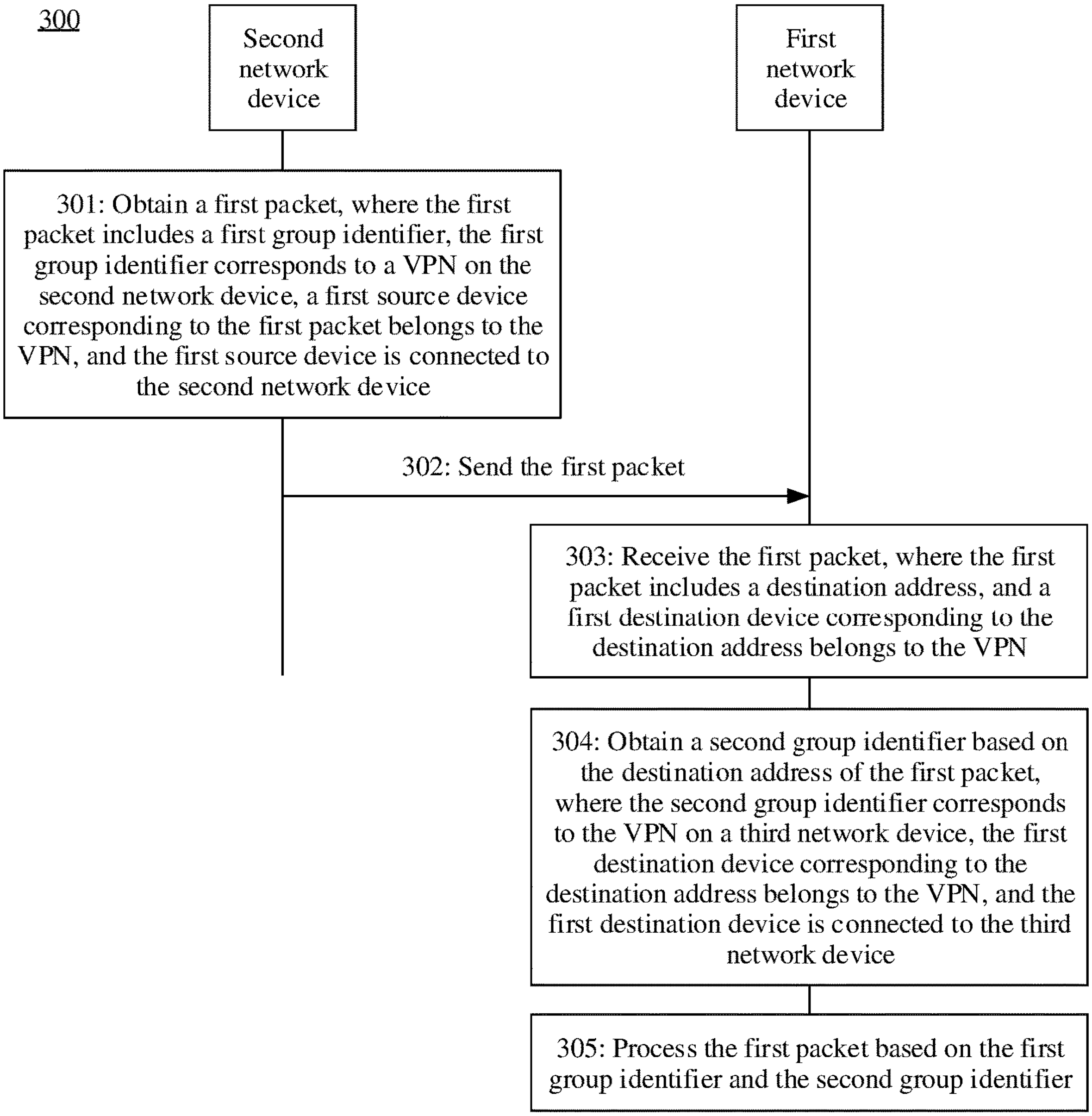
FIG. 3 is a flowchart of a packet processing method according to an embodiment of this application.

With reference to FIG. 3, an embodiment of this application provides a packet processing method 300. The method 300 is applied to the network architecture 100 shown in FIG. 1, and includes the following steps.

Step 301: A second network device obtains a first packet, where the first packet includes a first group identifier, the first group identifier corresponds to a VPN on the second network device, a first source device corresponding to the first packet belongs to the VPN, and the first source device is connected to the second network device.

The first source device is a terminal device connected to the second network device. For example, the first source device is a CE connected to the second network device. The second network device includes a first interface, the first source device is connected to the first interface of the second network device, and the first interface is bound to the VPN.

In step 301, the first packet is obtained according to the following operations 3011 to 3013, and the operations 3011 to 3013 are separately as follows.

3011: The second network device receives, through the first interface, a third packet sent by the first source device.

Figure 4:
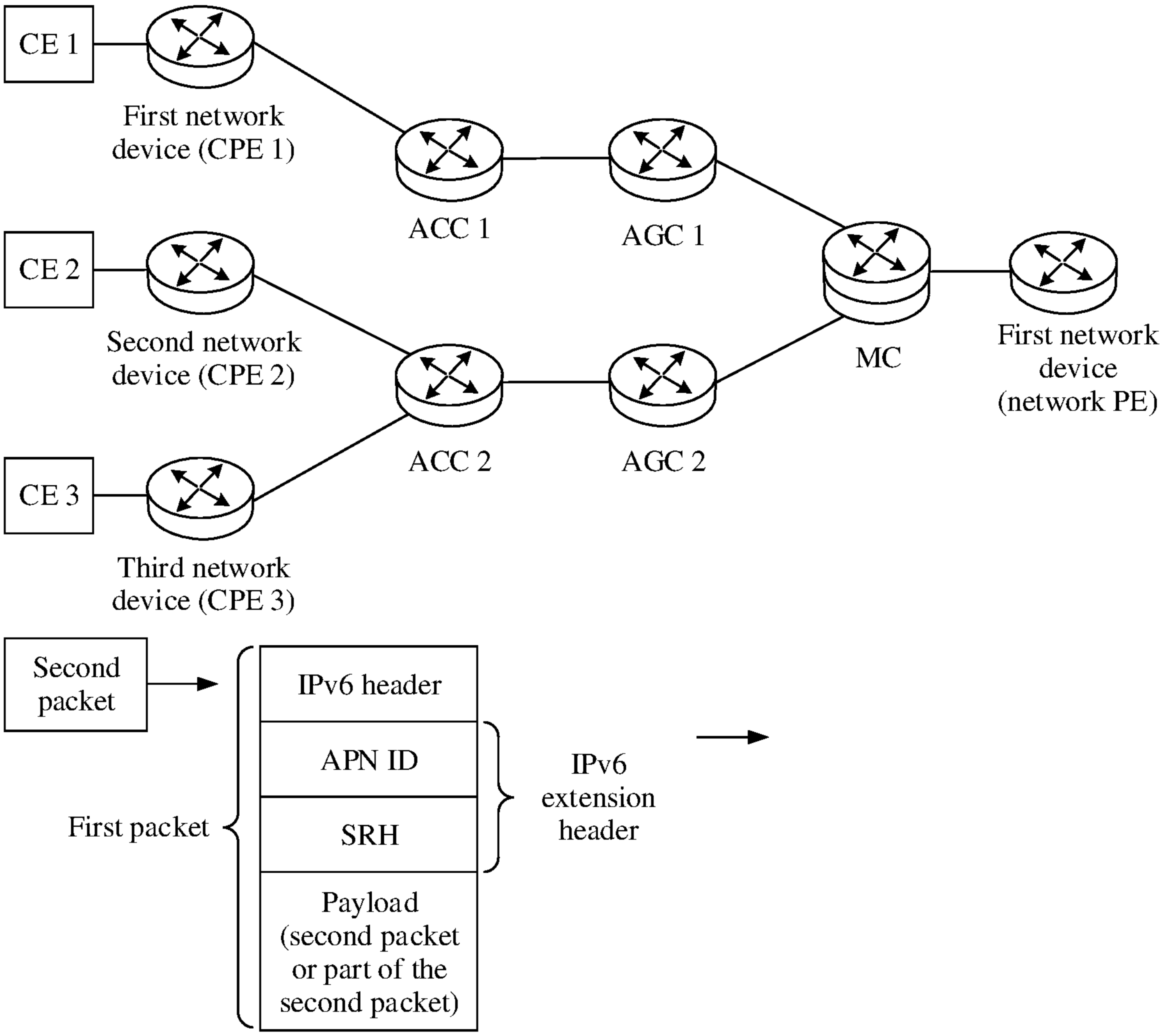
FIG. 4 is a schematic diagram of a first packet according to an embodiment of this application.
Figure 5:
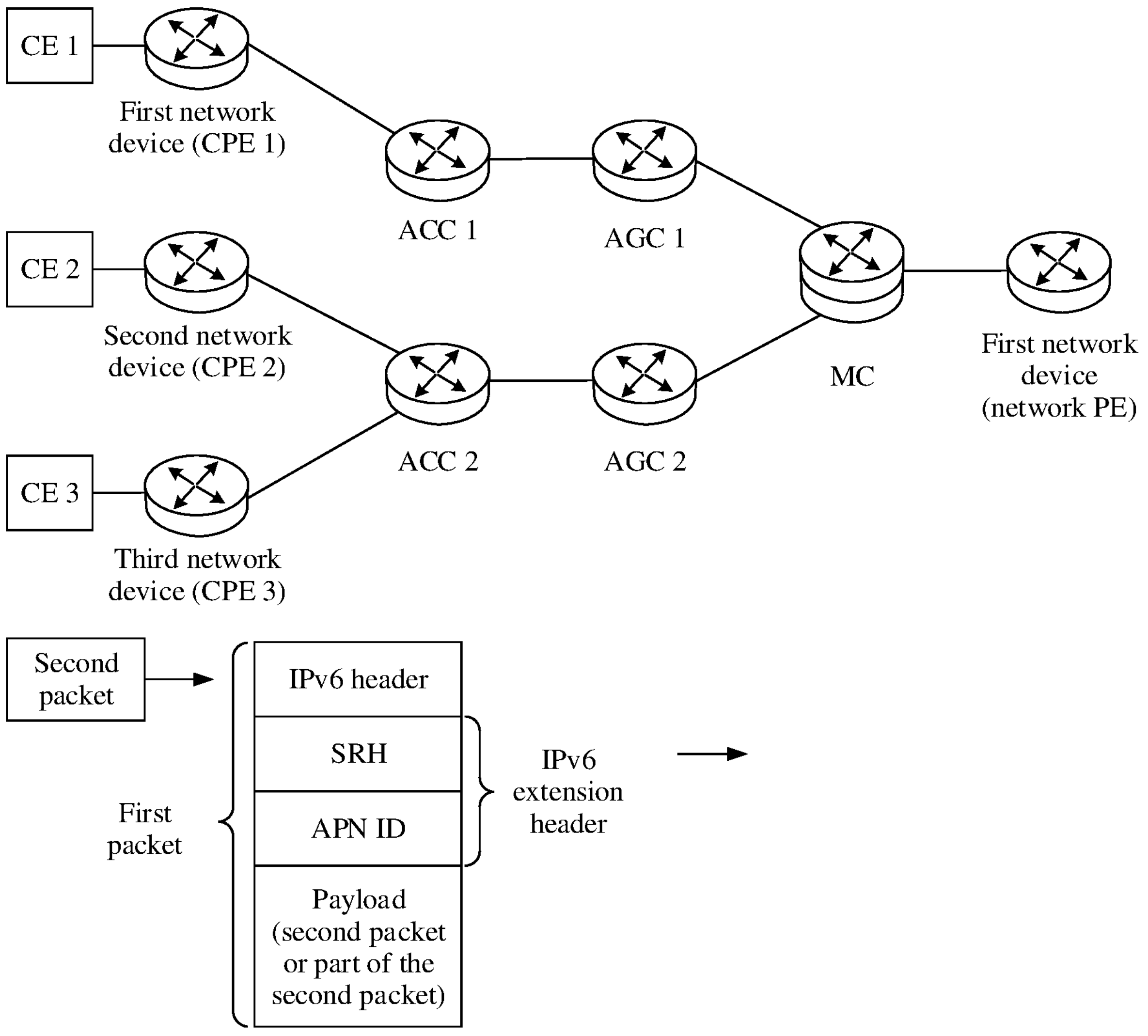
FIG. 5 is a schematic diagram of another first packet according to an embodiment of this application.

For example, with reference to FIG. 4 or FIG. 5, it is assumed that the first source device is a CE 1, the second network device (a CPE 1) receives the third packet of the CE 1, a source address in the first packet is an address IP-CE1 of the CE 1, and a destination address is an address IP-CE2 of a CE 2.

3012: The second network device determines the VPN bound to the first interface.

The second network device includes an interface binding correspondence. In 3012, the second network device obtains an interface identifier of the first interface, and obtains, from the interface binding correspondence based on the interface identifier of the first interface, a network identifier of the VPN bound to the first interface.

For example, the second network device includes the interface binding correspondence shown in Table 1. The second network device obtains the interface identifier 1 of the first interface, and obtains, from the interface binding correspondence shown in Table 1 based on the interface identifier 1 of the first interface, the network identifier 1 of the VPN 1 bound to the first interface.

3013: The second network device obtains the first packet based on a second packet and the VPN bound to the first interface.

The second network device includes a group-network correspondence, and the group-network correspondence includes a first group-network correspondence or a second group-network correspondence. In 3013, the second network device obtains the first group identifier based on the network identifier of the VPN and the group-network correspondence. The first packet is obtained based on the first group identifier and the second packet. The first packet includes an Ipv6 extension header and a payload, the Ipv6 extension header of the first packet includes the first group identifier, and the payload of the first packet includes the second packet or a part of the second packet.

In some embodiments, the Ipv6 extension header includes a destination options header (internet protocol version 6 destination options header, DOH) and the like.

In some embodiments, the group-network correspondence is the first group-network correspondence, and the first group-network correspondence is used to store a correspondence between a network identifier of a VPN and a group identifier. The second network device obtains, based on the network identifier of the VPN, a corresponding group identifier from the first group-network correspondence, and uses the corresponding group identifier as the first group identifier.

For example, the second network device includes the first group-network correspondence shown in Table 2. The second network device obtains, based on the network identifier 1 of the VPN, the corresponding group identifier 1 from the first group-network correspondence shown in Table 2, and uses the group identifier 1 as the first group identifier.

In some embodiments, the group-network correspondence is the second group-network correspondence, and the second group-network correspondence is used to store a correspondence between a network identifier of a VPN, a group identifier, and an address. The second network device obtains a first address, where the first address includes a source address and/or a destination address of the second packet. The second network device obtains, based on the network identifier of the VPN and the first address, a corresponding group identifier from the second group-network correspondence, and uses the corresponding group identifier as the first group identifier.

In some embodiments, the first address includes the destination address of the second packet. For the first group identifier obtained from the second group-network correspondence based on the network identifier of the VPN and the first address, the first group identifier is used to identify a first device group and a second device group. The first device group includes the second network device and a terminal device that accesses the second network device and belongs to the VPN. The second device group includes a third network device and a terminal device that accesses the third network device and belongs to the VPN. The third network device is a network device accessed by a first destination device corresponding to the destination address.

For example, the second network device includes the second group-network correspondence shown in Table 3. The second network device obtains the destination address IP-CE2 of the second packet, and uses IP-CE2 as the first address. The second network device obtains, based on the network identifier 1 of the VPN 1 and the first address IP-CE2, the corresponding group identifier 1 from the second group-network correspondence shown in Table 3, and uses the group identifier 1 as the first group identifier.

With reference to FIG. 4 or FIG. 5, after obtaining the first group identifier, the second network device (the CPE 1) uses the second packet or partial content of the second packet as the payload, and encapsulates the Ipv6 extension header based on the payload, to obtain the first packet, where the Ipv6 extension header includes the first group identifier.

The Ipv6 extension header is located between an Ipv6 header of the first packet and the payload of the first packet. With reference to FIG. 4 or FIG. 5, the Ipv6 extension header includes the DOH and a segment routing header (SRH). The DOH includes an application-aware networking identifier (APN-ID), and the APN-ID includes the first group identifier (namely, the group identifier 1). In some embodiments, the first group identifier may also be included in a field, of the DOH, other than the APN-ID. For example, the first group identifier may be included in an optional type field of the DOH. Alternatively, the first group identifier is included in a field, of the Ipv6 extension header, other than the DOH. For example, the first group identifier is included in a TLV field in the Ipv6 extension header.

In some embodiments, with reference to FIG. 6, the DOH includes an APN header, and the APN header includes the following fields: an application-aware networking identifier type (APN-ID-Type), flags, an application-aware networking parameter type (APN-Para-Type), and the APN-ID. Optionally, the APN header further includes the following fields: intent and/or an application-aware networking parameter (APN-Para). Optionally, a length of the APN-ID is 32 bits, 128 bits, or the like.

In some embodiments, with reference to FIG. 7, the APN-ID includes the following fields: an application group identifier (APP-Group-ID), a user group identifier (User-Group-ID), and a reserved field. The User-Group-ID includes the first group identifier. Optionally, the first group identifier is an APN group identifier, a user group identifier, or the like.

In some embodiments, with reference to FIG. 4, the DOH is located before the SRH, to be specific, the DOH is located between the Ipv6 header and the SRH. Alternatively, with reference to FIG. 5, the DOH is located after the SRH, to be specific, the DOH is located between the SRH and the payload.

The SRH includes a segment list, the segment list includes a segment identifier of at least one network device, and the segment list indicates a segment of path.

For example, with reference to FIG. 4 or FIG. 5, the second network device (the CPE 1) obtains the first packet, where the DOH in the first packet is located after the SRH, and the segment list of the SRH includes a segment identifier of an access node (ACC) 1, a segment identifier of an aggregation node (AGG) 1, a segment identifier of a metro core node (MC), and a segment identifier of a first network device (a network PE).

Optionally, the first packet further includes the network identifier of the VPN.

Step 302: The second network device sends the first packet to the first network device.

There may be at least one other network device between the second network device and the first network device. After receiving the first packet, the other network device forwards the first packet to the first network device.

For example, with reference to FIG. 4 or FIG. 5, network devices such as the ACC 1, the AGG 1, and the MC exist between the second network device (the CPE 1) and the first network device (the network PE). The segment list of the SRH of the first packet includes the segment identifier of the ACC 1, the segment identifier of the AGG 1, the segment identifier of the MC, and the segment identifier of the first network device (the network PE). After the second network device (the CPE 1) sends the first packet, the ACC 1 receives the first packet, obtains the segment identifier of the AGG 1 from the segment list of the SRH of the first packet, and sends the first packet to the AGG 1. The AGG 1 receives the first packet, obtains the segment identifier of the MC from the segment list of the SRH of the first packet, and sends the first packet to the MC. The MC receives the first packet, obtains the segment identifier of the first network device (the network PE) from the segment list of the SRH of the first packet, and sends the first packet to the first network device. The first network device receives the first packet.

A last-hop network device of the path indicated by the segment list is the first network device. With reference to FIG. 4, in the first packet, when the DOH is located before the SRH, any network device on the path may parse the DOH located before the SRH when receiving the first packet. In this embodiment, when the network device is not the last-hop network device of the path, the network device receives the first packet and parses the DOH located before the SRH. If the network device finds, through parsing, that content of the DOH is not content related to the network device, the network device does not process the content of the DOH, continues to parse the SRH, obtains a segment identifier of a next-hop network device from the segment list in the SRH, and sends the first packet to the next-hop network device based on the segment identifier. For the last-hop network device of the path, namely, the first network device, the first network device receives the first packet, parses the DOH located before the SRH to obtain the first group identifier, and then processes the first packet by using the first group identifier according to a subsequent procedure.

With reference to FIG. 5, in the first packet, when the DOH is located after the SRH, a network device other than the first network device on the path receives the first packet, but does not parse the DOH located after the SRH. Only the first network device parses, after receiving the first packet, the DOH located after the SRH to obtain the first group identifier, and then processes the first packet by using the first group identifier according to a subsequent procedure. In this way, an error of the first group identifier that may be caused by DOH parsing performed by the another network device may be avoided. In addition, because the another network device does not parse the DOH, a delay in forwarding the first packet by the another network device is reduced, and occupied computing resources of the another network device are reduced.

Step 303: The first network device receives the first packet, where the first packet includes a destination address, the first destination device corresponding to the destination address belongs to the VPN, and the first destination device is connected to the third network device.

The destination address of the first packet is the same as the destination address of the second packet.

Step 304: The first network device obtains a second group identifier based on the destination address of the first packet, where the second group identifier corresponds to the VPN on the third network device.

The second group identifier is used to identify a device group, and the device group includes the third network device and the terminal device that accesses the third network device and belongs to the VPN.

In step 304, the first network device obtains the second group identifier according to the following operations 3041 and 3042, and the operations 3041 and 3042 are separately as follows.

3041: The first network device obtains, based on the destination address of the first packet, routing information used to send the first packet, where the routing information includes an address of the third network device.

The first network device includes a routing table. The routing table includes at least one piece of routing information, and each piece of routing information includes a destination address and an address of a next-hop device from the first network device to the destination address.

In 3041, the first network device obtains, based on the destination address of the first packet, routing information including the destination address, where the routing information is routing information used to indicate the first network device to send the first packet, and the routing information further includes an address of a next-hop device from the first network device to the destination address. Then, the first network device uses the address of the next-hop device as the address of the third network device.

For example, a piece of routing information including IP-CE2 and IP-CPE2 exists in the routing table of the first network device. The first network device obtains, based on the destination address IP-CE2 of the first packet, routing information including the destination address IP-CE2, where an address of a next-hop device that is included in the routing information is IP-CPE2. Then, the first network device uses the address IP-CPE2 of the next-hop device as the address of the third network device.

3042: The first network device obtains the second group identifier based on the address of the third network device and the network identifier of the VPN.

The first network device includes a third group-network correspondence. In 3042, the first network device obtains the network identifier of the VPN from the first packet, obtains a corresponding group identifier from the third group-network correspondence based on the address of the third network device and the network identifier of the VPN, and uses the obtained group identifier as the second group identifier.

For example, the first packet includes the network identifier 1 of the VPN 1, and the first network device includes the third group-network correspondence shown in Table 4. The first network device obtains the network identifier 1 of the VPN 1 from the first packet, obtains, based on the network identifier 1 and the address IP-CPE2 of the third network device, the corresponding group identifier 2 from the third group-network correspondence shown in Table 4, and uses the group identifier 2 as the second group identifier.

The third group-network correspondence includes a record including the address of the third network device, the network identifier of the VPN, and the second group identifier, the first network device includes the routing information used to send the first packet, and the routing information includes the destination address of the first packet and the address of the third network device. In this way, the routing information in the first network device may be reused to obtain the second group identifier, so that algorithm implementation complexity is reduced.

Step 305: The first network device processes the first packet based on the first group identifier and the second group identifier.

In step 305, the first network device processes the first packet in the following two manners. The two manners are separately as follows.

In a first manner, the first network device compares the first group identifier with the second group identifier, and if the first group identifier is the same as the second group identifier, the first network device determines that the second network device is connected to the third network device, and sends the first packet to the third network device; if the first group identifier is different from the second group identifier, the first network device determines that the second network device is isolated from the third network device, and discards the first packet.

Alternatively, the first network device compares the first group identifier with the second group identifier, and if the first group identifier is the same as the second group identifier, the first network device determines that the second network device is isolated from the third network device, and discards the first packet; if the first group identifier is different from the second group identifier, the first network device determines that the second network device is connected to the third network device, and sends the first packet to the third network device.

In the first manner, the second network device includes the second group-network correspondence. If the first group identifier is obtained from the second group-network correspondence based on the network identifier of the VPN and the destination address of the second packet, the first group identifier is used to identify the first device group and the second device group, and a second device group identified by the first group identifier is the same as the device group identified by the second group identifier. In this way, a network management system controls interconnection or isolation between the first device group and the second device group by configuring whether the first group identifier corresponding to the second device group is the same as the second group identifier.

In the first manner, the third network device receives the first packet, obtains the second packet based on the first packet, and sends the second packet to the first destination device corresponding to the destination address in the second packet.

In the first manner, for group identifiers corresponding to a same VPN on network devices, if the group identifiers corresponding to the VPN on the network devices are the same, it indicates that the network devices are interconnected in the VPN; if the group identifiers corresponding to the VPN on the network devices are different, it indicates that the network devices are isolated in the VPN.

In this way, for the foregoing scenario 1, group identifiers corresponding to the VPN on network devices are set to be the same, so that the network devices are interconnected. For example, with reference to FIG. 2(*a*), group identifiers corresponding to a same VPN on the second network device 102, the third network device 103, and the fourth network device 104 are the same. That the second network device 102 sends a packet to the third network device 103 is used as an example. The packet includes a group identifier corresponding to the VPN on the second network device 102. The first network device 101 receives the packet, and obtains a group identifier corresponding to the VPN on the third network device 103. Because the group identifier corresponding to the VPN on the second network device 102 is the same as the group identifier corresponding to the VPN on the third network device 103, the first network device 101 sends the packet to the third network device 103, so that the second network device 102 and the third network device 103 are interconnected.

For the foregoing scenario 2, group identifiers corresponding to the VPN on network devices are set to be different, so that the network devices are all isolated, and branches are not interconnected. For example, with reference to FIG. 2(*b*), group identifiers corresponding to a same VPN on the second network device 102, the third network device 103, and the fourth network device 104 are different. That the second network device 102 sends a packet to the third network device 103 is used as an example. The packet includes a group identifier corresponding to the VPN on the second network device 102. The first network device 101 receives the packet, and obtains a group identifier corresponding to the VPN on the third network device 103. Because the group identifier corresponding to the VPN on the second network device 102 is different from the group identifier corresponding to the VPN on the third network device 103, the first network device 101 discards the packet, so that the second network device 102 and the third network device 103 are isolated.

For the foregoing scenario 3, for the first part of branches, group identifiers corresponding to the VPN on network devices of the first part of branches are set to be the same. For the second part of branches, group identifiers corresponding to the VPN on network devices of the second part of branches are set to be different from the group identifiers corresponding to the VPN on the network devices of the first part of branches. In this way, some network devices are isolated and some network devices are interconnected. In other words, some branches are isolated and some branches are interconnected.

For example, with reference to FIG. 2(*c*), group identifiers corresponding to the VPN on the second network device 102 and the third network device 103 are the same. However, a group identifier corresponding to the VPN on the fourth network device 104 is different from the group identifiers corresponding to the VPN on the second network device 102 and the third network device 103. That the second network device 102 sends a packet to the third network device 103 is used as an example. The packet includes a group identifier corresponding to the VPN on the second network device 102. The first network device 101 receives the packet, and obtains a group identifier corresponding to the VPN on the third network device 103. Because the group identifier corresponding to the VPN on the second network device 102 is the same as the group identifier corresponding to the VPN on the third network device 103, the first network device 101 sends the packet to the third network device 103, so that the second network device 102 and the third network device 103 are interconnected. Then, that the second network device 102 sends a packet to the fourth network device 104 is used as an example. The packet includes the group identifier corresponding to the VPN on the second network device 102. The first network device 101 receives the packet, and obtains the group identifier corresponding to the VPN on the fourth network device 104. Because the group identifier corresponding to the VPN on the second network device 102 is different from the group identifier corresponding to the VPN on the fourth network device 104, the first network device 101 discards the packet, so that the second network device 102 and the fourth network device 104 are isolated.

In the first manner, when the two group identifiers are the same, it indicates that the two network devices are interconnected; when the two group identifiers are different, it indicates that the two network devices are isolated. Certainly, alternatively, when the two group identifiers are different, it indicates that the two network devices are interconnected; when the two group identifiers are the same, it indicates that the two network devices are isolated.

For example, the first manner may alternatively be as follows: The first network device compares the first group identifier with the second group identifier, and if the first group identifier is the same as the second group identifier, the first network device determines that the second network device is isolated from the third network device, and discards the first packet; if the first group identifier is different from the second group identifier, the first network device determines that the second network device is connected to the third network device, and sends the first packet to the third network device.

In a second manner, the second network device includes the first group-network correspondence, where the first group-network correspondence is used to store a correspondence between a network identifier of a VPN and a group identifier. The first network device obtains a first processing policy based on the first group identifier and the second group identifier, and processes the first packet based on the first processing policy.

In the second manner, the second network device processes the first packet according to the following operations 3051 and 3052, and the operations 3051 and 3052 are separately as follows.

3051: The first network device obtains the first processing policy based on the first group identifier and the second group identifier.

The first network device includes a group-policy correspondence. In 3041, the first network device obtains a corresponding processing policy from the group-policy correspondence based on the first group identifier and the second group identifier, and uses the corresponding processing policy as the first processing policy.

For example, the first network device includes the group-policy correspondence shown in Table 5. The first group identifier obtained by the first network device from the first packet is the group identifier 1, and the second group identifier obtained by the first network device is the group identifier 2. The first network device obtains, based on the group identifier 1 and the group identifier 2, the corresponding processing policy 1 from the group-policy correspondence shown in Table 5, and uses the processing policy 1 as the first grouping policy.

3052: The first network device processes the first packet based on the first processing policy.

In some embodiments, the first network device sends the first packet to the third network device when the first processing policy indicates that a transmission direction from the second network device to the third network device is connected. In this way, the transmission direction from the second network device to the third network device is connected by using the first processing policy.

In some embodiments, the first network device discards the first packet when the first processing policy indicates that the transmission direction from the second network device to the third network device is isolated. In this way, the transmission direction from the second network device to the third network device is isolated by using the first processing policy.

Because the group-policy correspondence includes a record including the first group identifier, the second group identifier, and the first processing policy, the first processing policy is accurately obtained by using the group-policy correspondence, and whether the second network device is connected to or isolated from the third network device can be accurately determined by using the first processing policy.

In the second manner, for two group identifiers corresponding to a same VPN on two network devices, interconnection or isolation in one or two transmission directions between the two network devices may be implemented by using a processing policy corresponding to the two group identifiers. An example in which the VPN 1 corresponds to the group identifier 1 on the second network device 102, the VPN 1 corresponds to the group identifier 2 on the third network device 103, and the VPN 1 corresponds to a group identifier 3 on the fourth network device 104 is used for description.

For the foregoing scenario 1, with reference to FIG. 2(*a*), the processing policy 1 corresponding to the group identifier 1 and the group identifier 2 indicates that a transmission direction from the second network device 102 to the third network device 103 is connected and/or a transmission direction from the third network device 103 to the second network device 102 is connected. A processing policy 2 corresponding to the group identifier 1 and the group identifier 3 indicates that a transmission direction from the second network device 102 to the fourth network device 104 is connected and/or a transmission direction from the fourth network device 104 to the second network device 102 is connected. A processing policy 3 corresponding to the group identifier 2 and the group identifier 3 indicates that a transmission direction from the third network device 103 to the fourth network device 104 is connected and/or a transmission direction from the fourth network device 104 to the third network device 103 is connected. That the second network device 102 sends a packet to the third network device 103 is used as an example. The packet includes the group identifier 1. The first network device 101 receives the packet, obtains the group identifier 2 corresponding to the VPN 1 on the third network device 103, and obtains the processing policy 1 corresponding to the group identifier 1 and the group identifier 2. Because the processing policy 1 indicates that the transmission direction from the second network device 102 to the third network device 103 is connected, the first network device 101 sends the packet to the third network device 103. In this way, the transmission direction from the second network device 102 to the third network device 103 is connected.

For the foregoing scenario 2, with reference to FIG. 2(*b*), the processing policy 1 corresponding to the group identifier 1 and the group identifier 2 indicates that a transmission direction from the second network device 102 to the third network device 103 is isolated and/or a transmission direction from the third network device 103 to the second network device 102 is isolated. A processing policy 2 corresponding to the group identifier 1 and the group identifier 3 indicates that a transmission direction from the second network device 102 to the fourth network device 104 is isolated and/or a transmission direction from the fourth network device 104 to the second network device 102 is isolated. A processing policy 3 corresponding to the group identifier 2 and the group identifier 3 indicates that a transmission direction from the third network device 103 to the fourth network device 104 is isolated and/or a transmission direction from the fourth network device 104 to the third network device 103 is isolated. That the second network device 102 sends a packet to the third network device 103 is used as an example. The packet includes the group identifier 1. The first network device 101 receives the packet, obtains the group identifier 2 corresponding to the VPN 1 on the third network device 103, and obtains the processing policy 1 corresponding to the group identifier 1 and the group identifier 2. Because the processing policy 1 indicates that the transmission direction from the second network device 102 to the third network device 103 is isolated, the first network device 101 discards the packet. In this way, the transmission direction from the second network device 102 to the third network device 103 is isolated.

For the foregoing scenario 3, for network devices in the first part of branches, in other words, for the second network device 102 and the third network device 103, the VPN 1 corresponds to the group identifier 1 on the second network device 102, the VPN 1 corresponds to the group identifier 2 on the third network device 103, and the processing policy 1 corresponding to the group identifier 1 and the group identifier 2 indicates that a transmission direction from the second network device 102 to the third network device 103 is connected and/or a transmission direction from the third network device 103 to the second network device 102 is connected. For network devices in the second part of branches, in other words, for the fourth network device 104, the VPN 1 corresponds to the group identifier 3 on the fourth network device 104, and a processing policy 2 corresponding to the group identifier 1 and the group identifier 3 indicates that a transmission direction from the second network device 102 to the fourth network device 104 is isolated and/or a transmission direction from the fourth network device 104 to the second network device 102 is isolated.

That the second network device 102 sends a packet to the third network device 103 is used as an example. The packet includes the group identifier 1 corresponding to the VPN 1 on the second network device 102. The first network device 101 receives the packet, obtains the group identifier 2 corresponding to the VPN 1 on the third network device 103, and obtains the processing policy 1 corresponding to the group identifier 1 and the group identifier 2. Because the processing policy 1 indicates that the transmission direction from the second network device 102 to the third network device 103 is connected, the first network device 101 sends the packet to the third network device 103. In this way, the transmission direction from the second network device 102 to the third network device 103 is connected. Then, that the second network device 102 sends a packet to the fourth network device 104 is used as an example. The packet includes the group identifier 1 corresponding to the VPN 1 on the second network device 102. The first network device 101 receives the packet, obtains the group identifier 3 corresponding to the VPN 1 on the fourth network device 104, and obtains the processing policy 2 corresponding to the group identifier 1 and the group identifier 3. Because the processing policy 2 indicates that the transmission direction from the second network device 102 to the fourth network device 104 is isolated, the first network device 101 discards the packet. In this way, the transmission direction from the second network device 102 to the fourth network device 104 is isolated.

For the foregoing scenario 4, for the second network device 102 and the third network device 103, the VPN 1 corresponds to the group identifier 1 on the second network device 102, the VPN 1 corresponds to the group identifier 2 on the third network device 103, and the processing policy 1 corresponding to the group identifier 1 and the group identifier 2 indicates that a transmission direction from the second network device 102 to the third network device 103 is connected and/or a transmission direction from the third network device 103 to the second network device 102 is connected. For the second network device 102 and the fourth network device 104, the VPN 1 corresponds to the group identifier 3 on the fourth network device 104, and a processing policy 2 corresponding to the group identifier 1 and the group identifier 3 indicates that a transmission direction from the second network device 102 to the fourth network device 104 is isolated and/or a transmission direction from the fourth network device 104 to the second network device 102 is isolated. For the third network device 103 and the fourth network device 104, the VPN 1 corresponds to the group identifier 2 on the third network device 103, the VPN 1 corresponds to the group identifier 3 on the fourth network device 104, and a processing policy 3 corresponding to the group identifier 2 and the group identifier 3 indicates that a transmission direction from the third network device 103 to the fourth network device 104 is connected and/or a transmission direction from the fourth network device 104 to the third network device 103 is connected.

That the second network device 102 sends a packet to the third network device 103 is used as an example. The packet includes the group identifier 1 corresponding to the VPN 1 on the second network device 102. The first network device 101 receives the packet, obtains the group identifier 2 corresponding to the VPN 1 on the third network device 103, and obtains the processing policy 1 corresponding to the group identifier 1 and the group identifier 2. Because the processing policy 1 indicates that the transmission direction from the second network device 102 to the third network device 103 is connected, the first network device 101 sends the packet to the third network device 103. In this way, the transmission direction from the second network device 102 to the third network device 103 is connected. Then, that the second network device 102 sends a packet to the fourth network device 104 is used as an example. The packet includes the group identifier 1 corresponding to the VPN 1 on the second network device 102. The first network device 101 receives the packet, obtains the group identifier 3 corresponding to the VPN 1 on the fourth network device 104, and obtains the processing policy 2 corresponding to the group identifier 1 and the group identifier 3. Because the processing policy 2 indicates that the transmission direction from the second network device 102 to the fourth network device 104 is isolated, the first network device 101 discards the packet. In this way, the transmission direction from the second network device 102 to the fourth network device 104 is isolated. Further, that the third network device 103 sends a packet to the fourth network device 104 is used as an example. The packet includes the group identifier 2 corresponding to the VPN 1 on the third network device 103. The first network device 101 receives the packet, obtains the group identifier 3 corresponding to the VPN 1 on the fourth network device 104, and obtains the processing policy 3 corresponding to the group identifier 2 and the group identifier 3. Because the processing policy 3 indicates that the transmission direction from the third network device 103 to the fourth network device 104 is connected, the first network device 101 sends the packet to the fourth network device 104. In this way, the transmission direction from the third network device 103 to the fourth network device 104 is connected.

The process of steps 301 to 305 is repeated, so that network devices of some branches are connected, or network devices of some branches are isolated. For example, the second network device sends the second packet to the first network device, where the second packet includes a third group identifier, the third group identifier corresponds to the VPN on the second network device, a second source device corresponding to the second packet belongs to the VPN, and the second source device is connected to the second network device. The first network device receives the second packet, and obtains a fourth group identifier based on the destination address of the second packet, where the fourth group identifier corresponds to the VPN on a fourth network device, a second destination device corresponding to the destination address of the second packet belongs to the VPN, and the second destination device is connected to the fourth network device. The first network device processes the second packet based on the third group identifier and the fourth group identifier. It is assumed that processing the first packet includes sending the first packet to the third network device, and processing the second packet includes discarding the second packet. In this case, the transmission direction from the second network device to the third network device is connected, and a transmission direction from the second network device to the fourth network device is isolated.

It should be noted that when a new branch is added, if the new branch and an existing branch are interconnected, a group identifier is configured on a network device in the new branch, where the group identifier is the same as a group identifier on a network device in the existing branch, or a processing policy corresponding to both the group identifier and a group identifier on a network device in the existing branch indicates connectivity. If the new branch and an existing branch are isolated, a group identifier is configured on a network device in the new branch, where the group identifier is different from a group identifier on a network device in the existing branch, or a processing policy corresponding to both the group identifier and a group identifier on a network device in the existing branch indicates isolation. In this way, when the new branch is added, only the network device in the new branch needs to be configured, and the network device in the existing branch and the first network device do not need to be configured, so that a quantity of network devices that need to be configured is reduced and configuration efficiency is improved.

In this embodiment, the first packet sent by the second network device includes the first group identifier, the first group identifier corresponds to the VPN on the second network device, and a source device corresponding to the first packet belongs to the VPN. After receiving the first packet, the first network device obtains the second group identifier based on the destination address of the first packet. The second group identifier corresponds to the VPN on the third network device. The first network device determines, based on the first group identifier and the second group identifier, whether the transmission direction from the second network device to the third network device is connected or isolated. If the transmission direction from the second network device to the third network device is connected, the first packet is sent to the third network device. If the transmission direction from the second network device to the third network device is isolated, the first packet is discarded. In this way, the group identifiers are used to implement a requirement of interconnection between some branches and isolation between some branches.

Figure 8:
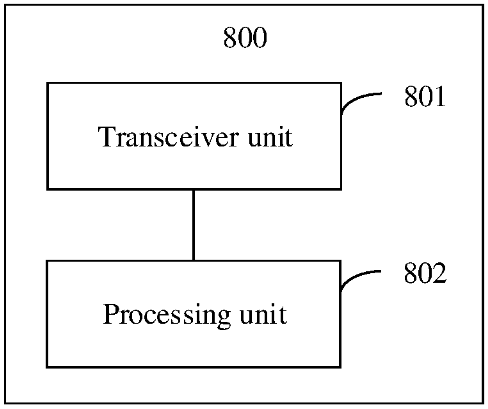
FIG. 8 is a schematic diagram of a structure of a packet processing apparatus according to an embodiment of this application.

With reference to FIG. 8, an embodiment of this application provides a packet processing apparatus 800. The apparatus 800 may be deployed on the first network device 101 in the network architecture 100 shown in FIG. 1, the first network device 101 in the scenario shown in FIG. 2, or the first network device in the method 300 shown in FIG. 3. The apparatus 800 includes a transceiver unit 801 and a processing unit 802.

The transceiver unit 801 is configured to receive a first packet sent by a second network device, where the first packet includes a first group identifier, the first group identifier corresponds to a virtual private network (VPN) on the second network device, a first source device corresponding to the first packet belongs to the VPN, and the first source device is connected to the second network device.

The processing unit 802 is configured to obtain a second group identifier based on a destination address of the first packet, where the second group identifier corresponds to the VPN on a third network device, a first destination device corresponding to the destination address of the first packet belongs to the VPN, and the first destination device is connected to the third network device.

The processing unit 802 is further configured to process the first packet based on the first group identifier and the second group identifier.

Optionally, for a detailed implementation process of receiving the first packet by the transceiver unit 801, refer to related content in step 303 of the method 300 shown in FIG. 3. Details are not described herein again.

Optionally, for a detailed implementation process of obtaining the second group identifier by the processing unit 802, refer to related content in step 304 of the method 300 shown in FIG. 3. Details are not described herein again.

Optionally, for a detailed implementation process of processing the first packet by the processing unit 802, refer to related content in step 305 of the method 300 shown in FIG. 3. Details are not described herein again.

Optionally, the processing unit 802 is configured to obtain a first processing policy based on the first group identifier and the second group identifier.

The processing unit 802 is further configured to process the first packet based on the first processing policy.

Optionally, for a detailed implementation process of obtaining the first processing policy and processing the first packet based on the first processing policy by the processing unit 802, refer to related content in step 305 of the method 300 shown in FIG. 3. Details are not described herein again.

Optionally, the processing unit 802 is configured to obtain the first processing policy based on the first group identifier, the second group identifier, and a first correspondence.

Optionally, for a detailed implementation process of obtaining the first processing policy by the processing unit 802, refer to related content in step 305 of the method 300 shown in FIG. 3. Details are not described herein again.

Optionally, the transceiver unit 801 is further configured to send the first packet to the third network device when the first processing policy indicates that a transmission direction from the second network device to the third network device is connected.

Optionally, for a detailed implementation process of sending the first packet by the transceiver unit 801, refer to related content in step 305 of the method 300 shown in FIG. 3. Details are not described herein again.

Optionally, the processing unit 802 is configured to discard the first packet when the first processing policy indicates that the transmission direction from the second network device to the third network device is isolated.

Optionally, the first processing policy further indicates that a transmission direction from the third network device to the second network device is connected, or the first processing policy further indicates that the transmission direction from the third network device to the second network device is isolated.

Optionally, the processing unit 802 is configured to obtain, based on the destination address of the first packet, routing information used to send the first packet, where the routing information includes an address of the third network device.

The processing unit 802 is further configured to obtain the second group identifier based on the address of the third network device, a network identifier of the VPN, and a second correspondence.

Optionally, for a detailed implementation process of obtaining the routing information by the processing unit 802, refer to related content in step 304 of the method 300 shown in FIG. 3. Details are not described herein again.

Optionally, for a detailed implementation process of obtaining the second group identifier based on the address of the third network device, the network identifier of the VPN, and the second correspondence by the processing unit 802, refer to related content in step 304 of the method 300 shown in FIG. 3. Details are not described herein again.

Optionally, the first group identifier is included in an internet protocol version 6 (Ipv6) extension header of the first packet.

Optionally, the first group identifier is included in an application-aware networking (APN) identifier of the Ipv6 extension header.

Optionally, the transceiver unit 801 is further configured to receive a second packet sent by the second network device, where the second packet includes a third group identifier, the third group identifier corresponds to the VPN on the second network device, a second source device corresponding to the second packet belongs to the VPN, and the second source device is connected to the second network device.

The processing unit 802 is further configured to obtain a fourth group identifier based on a destination address of the second packet, where the fourth group identifier corresponds to the VPN on a fourth network device, a second destination device corresponding to the destination address of the second packet belongs to the VPN, and the second destination device is connected to the fourth network device.

The processing unit 802 is further configured to process the second packet based on the third group identifier and the fourth group identifier.

Processing the first packet includes sending the first packet to the third network device, and processing the second packet includes discarding the second packet.

Optionally, the apparatus 800 includes a network-side edge device PE.

Optionally, the second network device includes a customer premises equipment (CPE) connected to the first source device, and the third network device includes a CPE connected to the first destination device.

Optionally, for a detailed implementation process of receiving the second packet by the transceiver unit 801, refer to related content in step 305 of the method 300 shown in FIG. 3. Details are not described herein again.

Optionally, for a detailed implementation process of obtaining the fourth group identifier by the processing unit 802, refer to related content in step 305 of the method 300 shown in FIG. 3. Details are not described herein again.

Optionally, for a detailed implementation process of processing the second packet by the processing unit 802, refer to related content in step 305 of the method 300 shown in FIG. 3. Details are not described herein again.

In this embodiment, the first packet includes the first group identifier, the first group identifier corresponds to the virtual private network (VPN) on the second network device, the processing unit obtains the second group identifier based on the destination address of the first packet, and the second group identifier corresponds to the VPN on the third network device. In this way, the processing unit processes the first packet based on the first group identifier and the second group identifier, for example, sends the first packet to the third network device or discards the first packet based on the first group identifier and the second group identifier, to connect the second network device to the third network device, or isolate the second network device from the third network device. In this way, a requirement of interconnection between some network devices and isolation between some networks is met.

Figure 9:
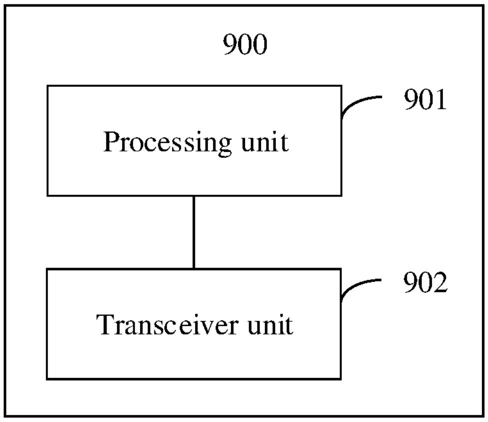
FIG. 9 is a schematic diagram of a structure of another packet processing apparatus according to an embodiment of this application.

With reference to FIG. 9, an embodiment of this application provides a packet processing apparatus 900. The apparatus 900 may be deployed on the second network device 102 in the network architecture 100 shown in FIG. 1, the second network device 102 in the scenario shown in FIG. 2, or the second network device in the method 300 shown in FIG. 3. The apparatus 900 includes a processing unit 901 and a transceiver unit 902.

The processing unit 901 is configured to obtain a first packet, where the first packet includes a first group identifier, the first group identifier corresponds to a virtual private network (VPN) on the apparatus, a first source device corresponding to the first packet belongs to the VPN, and the first source device is connected to the apparatus.

The transceiver unit 902 is configured to send the first packet to a first network device.

Optionally, for a detailed implementation process of obtaining the first packet by the processing unit 901, refer to related content in step 301 of the method 300 shown in FIG. 3. Details are not described herein again.

Optionally, for a detailed implementation process of sending the first packet by the transceiver unit 902, refer to related content in step 302 of the method 300 shown in FIG. 3. Details are not described herein again.

Optionally, the processing unit 901 is configured to obtain the first group identifier based on a network identifier of the VPN and a first correspondence.

Optionally, for a detailed implementation process of obtaining the first group identifier by the processing unit 901, refer to related content in step 301 of the method 300 shown in FIG. 3. Details are not described herein again.

Optionally, the apparatus 900 includes a first interface bound to the VPN, and the first interface is connected to the first source device.

The transceiver unit 902 is further configured to receive, through the first interface, a third packet sent by the first source device.

The processing unit 901 is further configured to obtain the first packet based on the third packet, where the first packet includes the identifier of the VPN.

Optionally, for a detailed implementation process of receiving the third packet by the transceiver unit 902, refer to related content in operation 3011 of the method 300 shown in FIG. 3. Details are not described herein again.

Optionally, for a detailed implementation process of obtaining the first packet based on the third packet by the processing unit 901, refer to related content in operations 3012 and 3013 of the method 300 shown in FIG. 3. Details are not described herein again.

Optionally, the apparatus 900 includes a customer premises equipment (CPE).

Optionally, the first network device includes a network-side edge device PE.

In this embodiment, because the first packet includes the first group identifier, and the first group identifier corresponds to the virtual private network (VPN) on the apparatus, after the transceiver unit sends the first packet, the first network device that receives the first packet processes the first packet based on the first group identifier. For example, the first network device sends the first packet to a third network device or discards the first packet based on the first group identifier, to connect the apparatus to the third network device, or isolate the apparatus from the third network device. In this way, a requirement of interconnection between some network devices and isolation between some networks is met.

Figure 10:
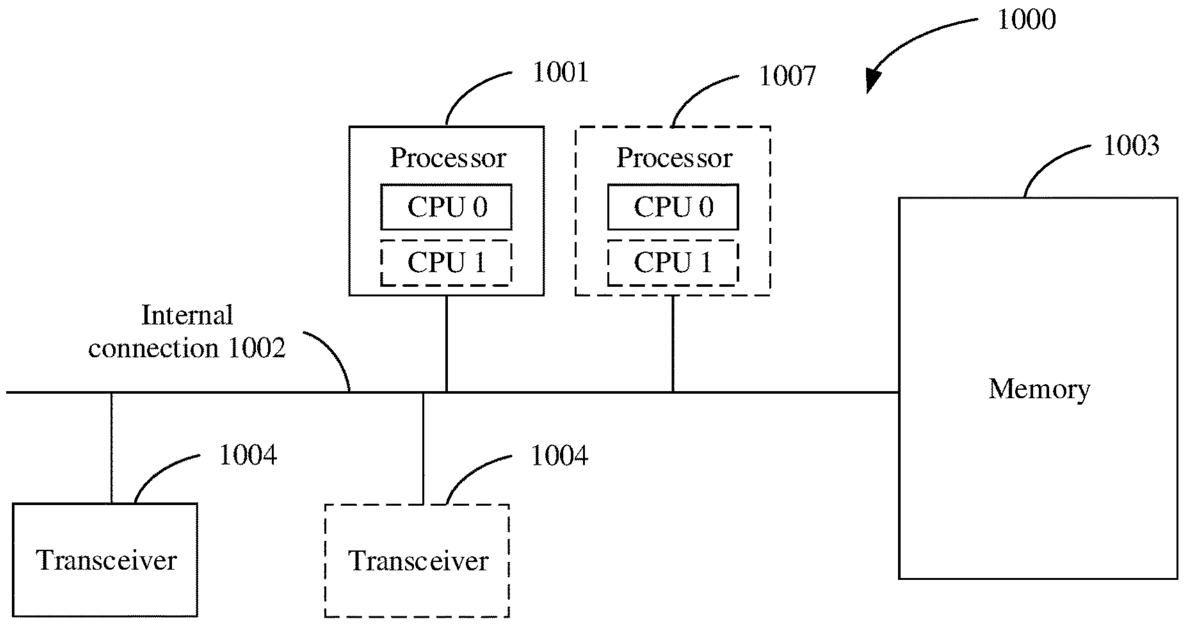
FIG. 10 is a schematic diagram of a structure of another packet processing apparatus according to an embodiment of this application.

FIG. 10 is a schematic diagram of a packet processing apparatus 1000 according to an embodiment of this application. The apparatus 1000 may be the first network device provided in any one of the foregoing embodiments. For example, the apparatus 1000 may be the first network device 101 in the network architecture 100 shown in FIG. 1, the first network device 101 in the scenario shown in FIG. 2, or the first network device in the method 300 shown in FIG. 3. The apparatus 1000 includes at least one processor 1001, an internal connection 1002, a memory 1003, and at least one transceiver 1004.

The apparatus 1000 is an apparatus of a hardware structure, and may be configured to implement the functional modules in the apparatus 800 shown in FIG. 8. For example, a person skilled in the art may figure out that functions corresponding to the processing unit 802 and the transceiver unit 801 in the apparatus 800 shown in FIG. 8 may be implemented by the at least one processor 1001 by invoking code in the memory 1003.

The apparatus 1000 may be further configured to implement a function of the first network device in any one of the foregoing embodiments.

The processor 1001 may be a general-purpose central processing unit (CPU), a network processor (NP), a microprocessor, an application-specific integrated circuit (ASIC), or one or more integrated circuits for controlling program execution of the solutions of this application.

The internal connection 1002 may include a path for transmitting information between the foregoing components. The internal connection 1002 may be a board, a bus, or the like.

The at least one transceiver 1004 is configured to communicate with another device or a communication network.

The memory 1003 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer. However, the memory 1003 is not limited thereto. The memory may exist independently, and is connected to the processor through the bus. The memory may alternatively be integrated with the processor.

The memory 1003 is configured to store application program code for performing the solutions of this application, and the processor 1001 controls the execution. The processor 1001 is configured to execute the application program code stored in the memory 1003, and cooperate with the at least one transceiver 1004, so that the apparatus 1000 implements a function in the method in this patent.

During specific implementation, in an embodiment, the processor 1001 may include one or more CPUs, for example, a CPU 0 and a CPU 1 in FIG. 10.

During specific implementation, in an embodiment, the apparatus 1000 may include a plurality of processors, for example, the processor 1001 and a processor 1007 in FIG. 10. Each of the processors may be a single-core (single-CPU) processor or a multi-core (multi-CPU) processor. The processor herein may be one or more devices, circuits, and/or processing cores configured to process data (for example, computer program instructions).

Figure 11:
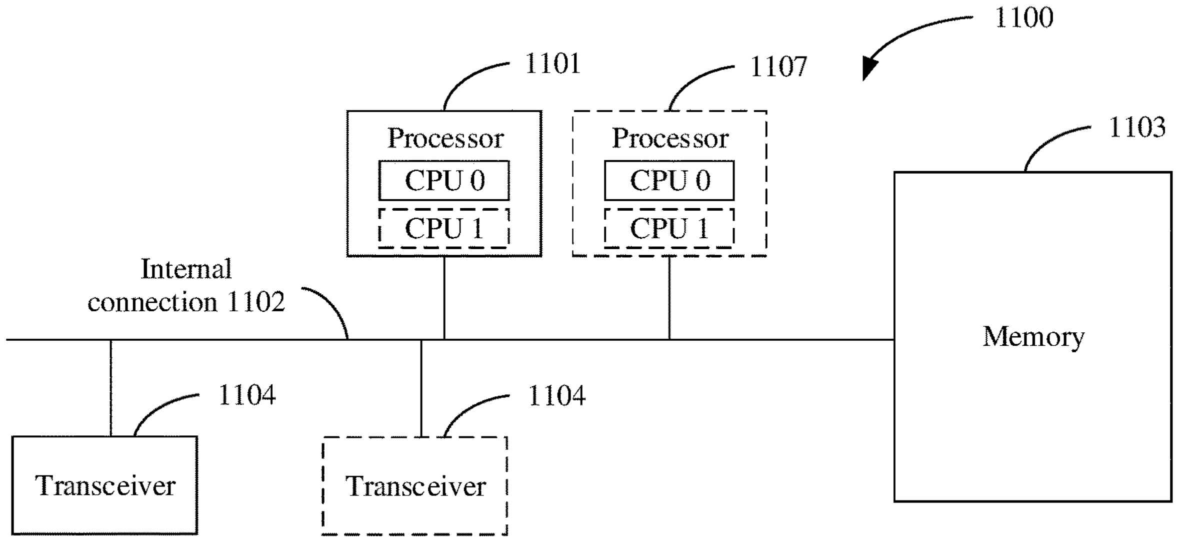
FIG. 11 is a schematic diagram of a structure of another packet processing apparatus according to an embodiment of this application.

FIG. 11 is a schematic diagram of a packet processing apparatus 1100 according to an embodiment of this application. The apparatus 1100 may be the second network device provided in any one of the foregoing embodiments. For example, the apparatus 1100 may be the second network device 102 in the network architecture 100 shown in FIG. 1, the second network device 102 in the scenario shown in FIG. 2, or the second network device in the method 300 shown in FIG. 3. The apparatus 1100 includes at least one processor 1101, an internal connection 1102, a memory 1103, and at least one transceiver 1104.

The apparatus 1100 is an apparatus of a hardware structure, and may be configured to implement the functional modules in the apparatus 900 shown in FIG. 9. For example, a person skilled in the art may figure out that functions corresponding to the processing unit 901 and the transceiver unit 902 in the apparatus 900 shown in FIG. 9 may be implemented by the at least one processor 1101 by invoking code in the memory 1103.

The apparatus 1100 may be further configured to implement a function of the second network device in any one of the foregoing embodiments.

The processor 1101 may be a general-purpose central processing unit (CPU), a network processor (NP), a microprocessor, an application-specific integrated circuit (ASIC), or one or more integrated circuits for controlling program execution of the solutions of this application.

The internal connection 1102 may include a path for transmitting information between the foregoing components. The internal connection 1102 may be a board, a bus, or the like.

The at least one transceiver 1104 is configured to communicate with another device or a communication network.

The memory 1103 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer. However, the memory 1103 is not limited thereto. The memory may exist independently, and is connected to the processor through the bus. The memory may alternatively be integrated with the processor.

The memory 1103 is configured to store application program code for performing the solutions of this application, and the processor 1101 controls the execution. The processor 1101 is configured to execute the application program code stored in the memory 1103, and cooperate with the at least one transceiver 1104, so that the apparatus 1100 implements a function in the method in this patent.

During specific implementation, in an embodiment, the processor 1101 may include one or more CPUs, for example, a CPU 0 and a CPU 1 in FIG. 11.

During specific implementation, in an embodiment, the apparatus 1100 may include a plurality of processors, for example, the processor 1101 and a processor 1107 in FIG. 11. Each of the processors may be a single-core (single-CPU) processor or a multi-core (multi-CPU) processor. The processor herein may be one or more devices, circuits, and/or processing cores configured to process data (for example, computer program instructions).

Figure 12:
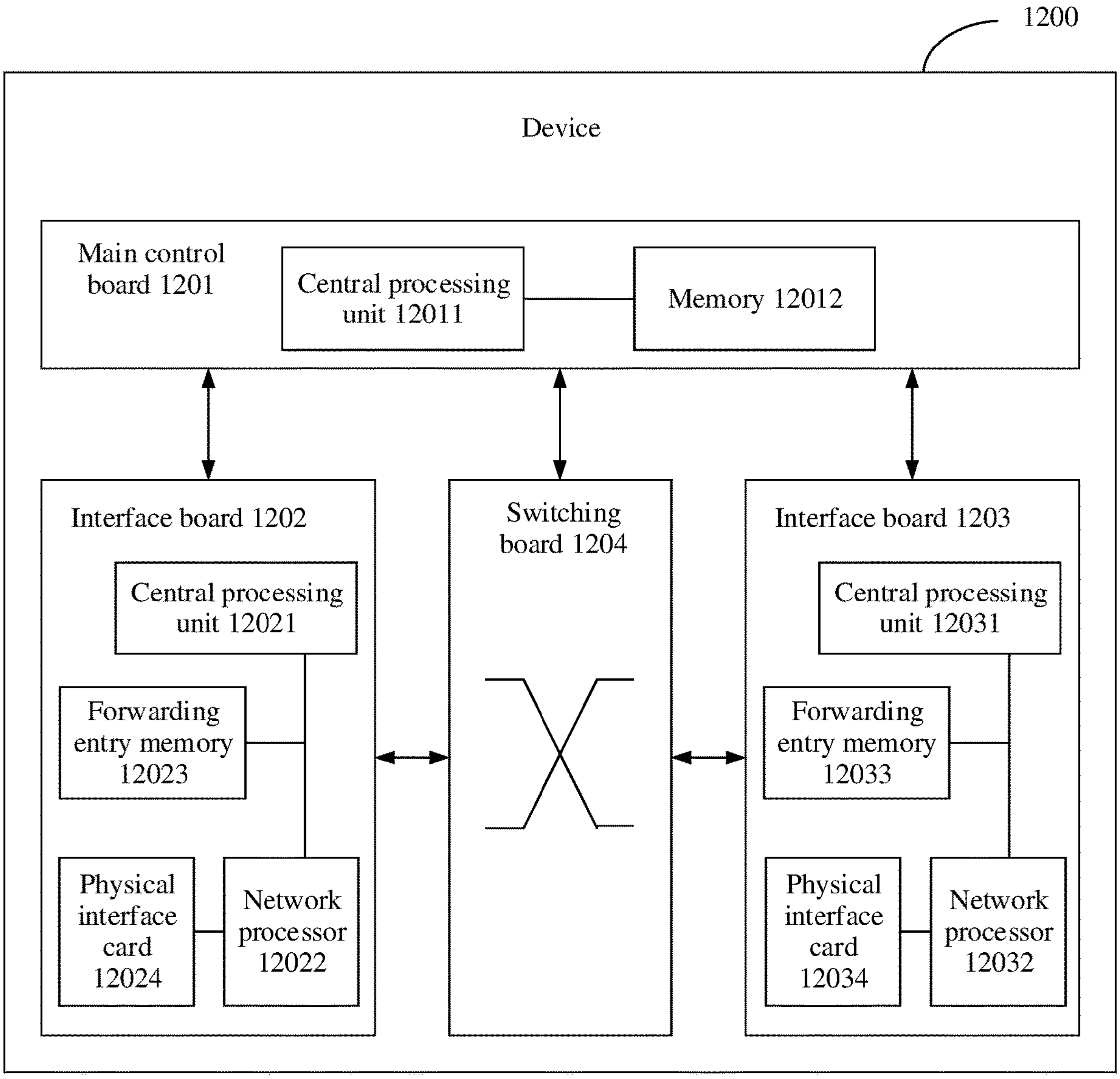
FIG. 12 is a schematic diagram of a structure of a device according to an embodiment of this application.

FIG. 12 is a schematic diagram of a structure of a device 1200 according to an example embodiment of this application. Optionally, the device 1200 is the first network device in any one of the foregoing embodiments. For example, the device 1200 may be the first network device 101 in the network architecture 100 shown in FIG. 1, the first network device 101 in the scenario shown in FIG. 2, the first network device in the method 300 shown in FIG. 3, the apparatus 800 shown in FIG. 8, or the apparatus 1000 shown in FIG. 10. In other words, the first network device in the method 300 shown in FIG. 3 may be implemented by the device 1200.

The device 1200 is, for example, a network device. For example, the device 1200 is a switch, a router, or the like. As shown in FIG. 12, the device 1200 includes a main control board 1201 and an interface board 1202.

The main control board 1201 is also referred to as a main processing unit (MPU) or a route processing card (route processor card). The main control board 1201 is configured to control and manage components in the device 1200, including route calculation, device management, device maintenance, and protocol processing. The main control board 1201 includes a central processing unit 12011 and a memory 12012.

The interface board 1202 is also referred to as a line processing unit (LPU), a line card, or a service board. The interface board 1202 is configured to: provide various service interfaces, and forward a data packet. The service interfaces include but are not limited to an Ethernet interface, a POS (Packet over SONET/SDH) interface, and the like. The Ethernet interface is, for example, a flexible Ethernet service interface (Flexible Ethernet Client, FlexE Client). The interface board 1202 includes a central processing unit 12021, a network processor 12022, a forwarding entry memory 12023, and a physical interface card (PIC) 12024.

The central processing unit 12021 on the interface board 1202 is configured to: control and manage the interface board 1202, and communicate with the central processing unit 12011 on the main control board 1201.

The network processor 12022 is configured to forward a packet. A form of the network processor 12022 may be a forwarding chip. The forwarding chip may be a network processor (NP). In some embodiments, the forwarding chip may be implemented by using an application-specific integrated circuit (ASIC) or a field programmable gate array (FPGA). Specifically, the network processor 12022 is configured to forward a received packet based on a forwarding table stored in the forwarding entry memory 12023. If a destination address of the packet is an address of the device 1200, the network processor 12022 sends the packet to a CPU (for example, the central processing unit 12021) for processing. If a destination address of the packet is not an address of the device 1200, the network processor 12022 finds, based on the destination address, a next hop and an outbound interface corresponding to the destination address in the forwarding table, and forwards the packet to the outbound interface corresponding to the destination address. Processing on an uplink packet may include processing at a packet ingress interface and forwarding table lookup, and processing on a downlink packet may include forwarding table lookup and the like. In some embodiments, the central processing unit may also perform a function of the forwarding chip, for example, implement software forwarding based on a general-purpose CPU, so that the interface board does not need the forwarding chip.

The physical interface card 12024 is configured to implement a physical layer interconnection function. Original traffic enters the interface board 1202 from the physical interface card 12024, and a processed packet is sent out from the physical interface card 12024. The physical interface card 12024, also referred to as a subcard, may be mounted on the interface board 1202, and is responsible for converting an optical/electrical signal into a packet, performing validity check on the packet, and forwarding the packet to the network processor 12022 for processing. In some embodiments, the central processing unit may also perform a function of the network processor 12022, for example, implement software forwarding based on a general-purpose CPU, so that the network processor 12022 is not required in the physical interface card 12024.

Optionally, the device 1200 includes a plurality of interface boards. For example, the device 1200 further includes an interface board 1203, and the interface board 1203 includes a central processing unit 12031, a network processor 12032, a forwarding entry memory 12033, and a physical interface card 12034. Functions and implementations of components in the interface board 1203 are the same as or similar to those of the interface board 1202, and details are not described herein again.

Optionally, the device 1200 further includes a switching board 1204. The switching board 1204 may also be referred to as a switch fabric unit (SFU). When the device 1200 has a plurality of interface boards, the switching board 1204 is configured to complete data exchange between the interface boards. For example, the interface board 1202 and the interface board 1203 may communicate with each other via the switching board 1204.

The main control board 1201 is coupled to the interface board 1202. For example, the main control board 1201, the interface board 1202, the interface board 1203, and the switching board 1204 are connected to a system backplane by using a system bus to implement interconnection. In a possible implementation, an inter-process communication (IPC) channel is established between the main control board 1201 and the interface board 1202, and the main control board 1201 communicates with the interface board 1202 through the IPC channel.

Logically, the device 1200 includes a control plane and a forwarding plane. The control plane includes the main control board 1201 and the central processing unit. The forwarding plane includes components that perform forwarding, such as the forwarding entry memory 12023, the physical interface card 12024, and the network processor 12022. The control plane performs functions such as routing, generating a forwarding table, processing signaling and a protocol packet, and configuring and maintaining a device status. The control plane delivers the generated forwarding table to the forwarding plane. At the forwarding plane, by performing table lookup based on the forwarding table delivered by the control plane, the network processor 12022 forwards a packet received by the physical interface card 12024. The forwarding table delivered by the control plane may be stored in the forwarding entry memory 12023. In some embodiments, the control plane and the forwarding plane may be completely separated, and are not on a same device.

It should be noted that, there may be one or more main control boards 1201, and when there are a plurality of main control boards, the main control boards may include an active main control board and a standby main control board. There may be one or more interface boards, and the device 1200 having a stronger data processing capability provides more interface boards. There may also be one or more physical interface cards on the interface board. There may be no switching board 1204 or one or more switching boards 1204. When there are a plurality of switching boards, load balancing and redundancy backup may be implemented together. In a centralized forwarding architecture, the device 1200 may not need the switching board, and the interface board provides a function of processing service data of an entire system. In a distributed forwarding architecture, the device 1200 may include at least one switching board 1204. Data exchange between a plurality of interface boards is implemented by using the switching board 1204, to provide a large-capacity data exchange and processing capability. Therefore, a data access and processing capability of the device 1200 of a distributed architecture is better than that of a device of a centralized architecture. Optionally, the device 1200 may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of device (for example, a network device such as a low-end switch or a router) has a weak data exchange and processing capability. A specific architecture that is to be used depends on a specific networking deployment scenario. This is not limited herein.

Figure 13:
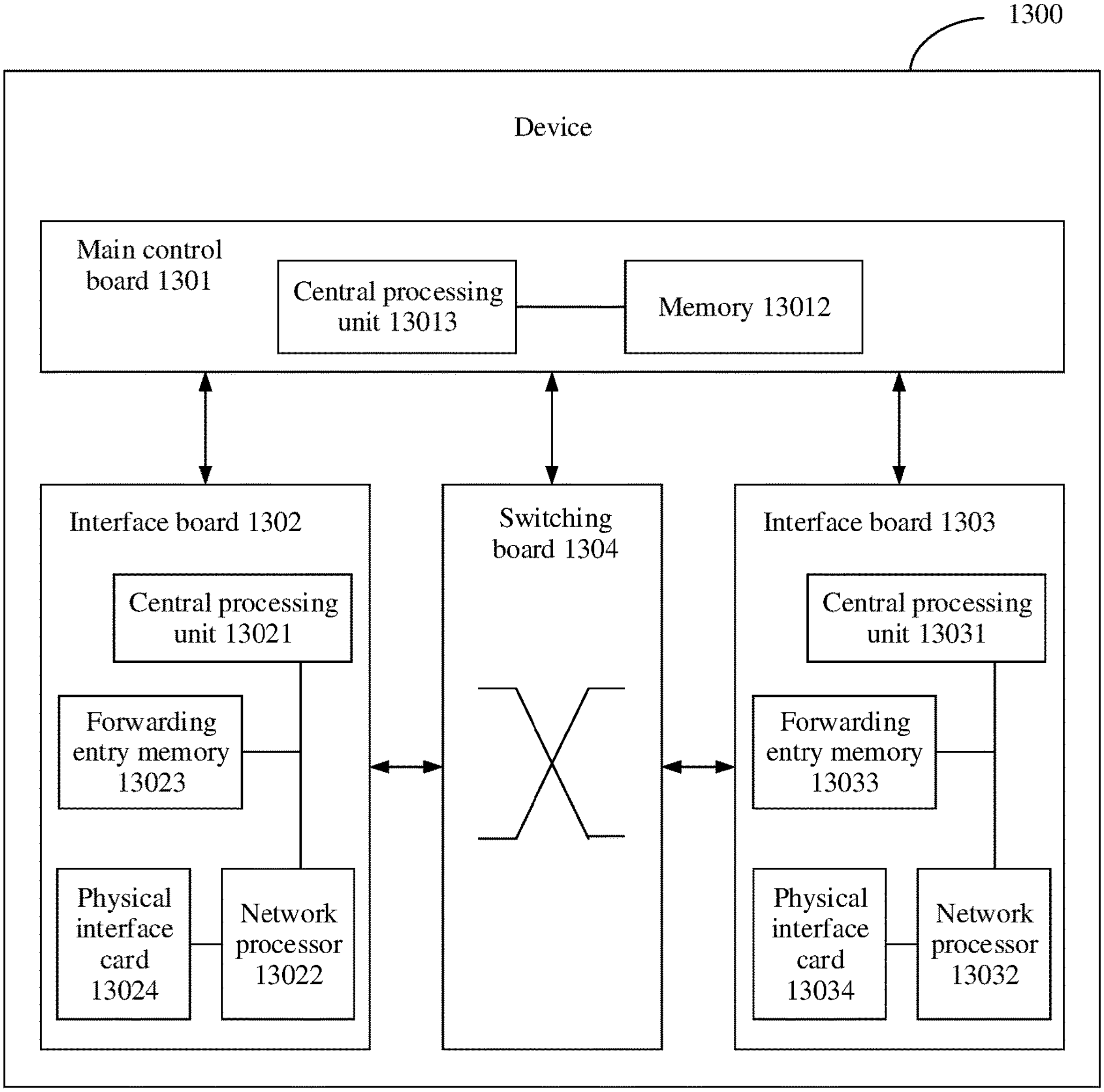
FIG. 13 is a schematic diagram of a structure of another device according to an embodiment of this application.

FIG. 13 is a schematic diagram of a structure of a device 1300 according to an example embodiment of this application. Optionally, the device 1300 is the second network device in any one of the foregoing embodiments. For example, the device 1300 may be the second network device 102 in the network architecture 100 shown in FIG. 1, the second network device 102 in the scenario shown in FIG. 2, the second network device in the method 300 shown in FIG. 3, the apparatus 900 shown in FIG. 9, or the apparatus 1100 shown in FIG. 11. In other words, the second network device in the method 300 shown in FIG. 3 may be implemented by the device 1300.

The device 1300 is, for example, a network device. For example, the device 1300 is a switch, a router, or the like. As shown in FIG. 13, the device 1300 includes a main control board 1301 and an interface board 1302.

The main control board 1301 is also referred to as a main processing unit (MPU) or a route processing card (route processor card). The main control board 1301 is configured to control and manage components in the device 1300, including route calculation, device management, device maintenance, and protocol processing. The main control board 1301 includes a central processing unit 13011 and a memory 13012.

The interface board 1302 is also referred to as a line processing unit (LPU), a line card, or a service board. The interface board 1302 is configured to: provide various service interfaces, and forward a data packet. The service interfaces include but are not limited to an Ethernet interface, a POS (Packet over SONET/SDH) interface, and the like. The Ethernet interface is, for example, a flexible Ethernet service interface (Flexible Ethernet Client, FlexE Client). The interface board 1302 includes a central processing unit 13021, a network processor 13022, a forwarding entry memory 13023, and a physical interface card (PIC) 13024.

The central processing unit 13021 on the interface board 1302 is configured to: control and manage the interface board 1302, and communicate with the central processing unit 13011 on the main control board 1301.

The network processor 13022 is configured to forward a packet. A form of the network processor 13022 may be a forwarding chip. The forwarding chip may be a network processor (NP). In some embodiments, the forwarding chip may be implemented by using an application-specific integrated circuit (ASIC) or a field programmable gate array (FPGA). Specifically, the network processor 13022 is configured to forward a received packet based on a forwarding table stored in the forwarding entry memory 13023. If a destination address of the packet is an address of the device 1300, the network processor 13022 sends the packet to a CPU (for example, the central processing unit 13021) for processing. If a destination address of the packet is not an address of the device 1300, the network processor 13022 finds, based on the destination address, a next hop and an outbound interface corresponding to the destination address in the forwarding table, and forwards the packet to the outbound interface corresponding to the destination address. Processing on an uplink packet may include processing at a packet ingress interface and forwarding table lookup, and processing on a downlink packet may include forwarding table lookup and the like. In some embodiments, the central processing unit may also perform a function of the forwarding chip, for example, implement software forwarding based on a general-purpose CPU, so that the interface board does not need the forwarding chip.

The physical interface card 13024 is configured to implement a physical layer interconnection function. Original traffic enters the interface board 1302 from the physical interface card 13024, and a processed packet is sent out from the physical interface card 13024. The physical interface card 13024, also referred to as a subcard, may be mounted on the interface board 1302, and is responsible for converting an optical/electrical signal into a packet, performing validity check on the packet, and forwarding the packet to the network processor 13022 for processing. In some embodiments, the central processing unit may also perform a function of the network processor 13022, for example, implement software forwarding based on a general-purpose CPU, so that the network processor 13022 is not required in the physical interface card 13024.

Optionally, the device 1300 includes a plurality of interface boards. For example, the device 1300 further includes an interface board 1303, and the interface board 1303 includes a central processing unit 13031, a network processor 13032, a forwarding entry memory 13033, and a physical interface card 13034. Functions and implementations of components in the interface board 1303 are the same as or similar to those of the interface board 1302, and details are not described herein again.

Optionally, the device 1300 further includes a switching board 1304. The switching board 1304 may also be referred to as a switch fabric unit (SFU). When the device 1300 has a plurality of interface boards, the switching board 1304 is configured to complete data exchange between the interface boards. For example, the interface board 1302 and the interface board 1303 may communicate with each other via the switching board 1304.

The main control board 1301 is coupled to the interface board 1302. For example, the main control board 1301, the interface board 1302, the interface board 1303, and the switching board 1304 are connected to a system backplane by using a system bus to implement interconnection. In a possible implementation, an inter-process communication (IPC) channel is established between the main control board 1301 and the interface board 1302, and the main control board 1301 communicates with the interface board 1302 through the IPC channel.

Logically, the device 1300 includes a control plane and a forwarding plane. The control plane includes the main control board 1301 and the central processing unit. The forwarding plane includes components that perform forwarding, such as the forwarding entry memory 13023, the physical interface card 13024, and the network processor 13022. The control plane performs functions such as routing, generating a forwarding table, processing signaling and a protocol packet, and configuring and maintaining a device status. The control plane delivers the generated forwarding table to the forwarding plane. At the forwarding plane, by performing table lookup based on the forwarding table delivered by the control plane, the network processor 13022 forwards a packet received by the physical interface card 13024. The forwarding table delivered by the control plane may be stored in the forwarding entry memory 13023. In some embodiments, the control plane and the forwarding plane may be completely separated, and are not on a same device.

It should be noted that, there may be one or more main control boards 1301, and when there are a plurality of main control boards, the main control boards may include an active main control board and a standby main control board. There may be one or more interface boards, and the device 1300 having a stronger data processing capability provides more interface boards. There may also be one or more physical interface cards on the interface board. There may be no switching board 1304 or one or more switching boards 1304. When there are a plurality of switching boards, load balancing and redundancy backup may be implemented together. In a centralized forwarding architecture, the device 1300 may not need the switching board, and the interface board provides a function of processing service data of an entire system. In a distributed forwarding architecture, the device 1300 may include at least one switching board 1304. Data exchange between a plurality of interface boards is implemented by using the switching board 1304, to provide a large-capacity data exchange and processing capability. Therefore, a data access and processing capability of the device 1300 of a distributed architecture is better than that of a device of a centralized architecture. Optionally, the device 1300 may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of device (for example, a network device such as a low-end switch or a router) has a weak data exchange and processing capability. A specific architecture that is to be used depends on a specific networking deployment scenario. This is not limited herein.

Figure 14:
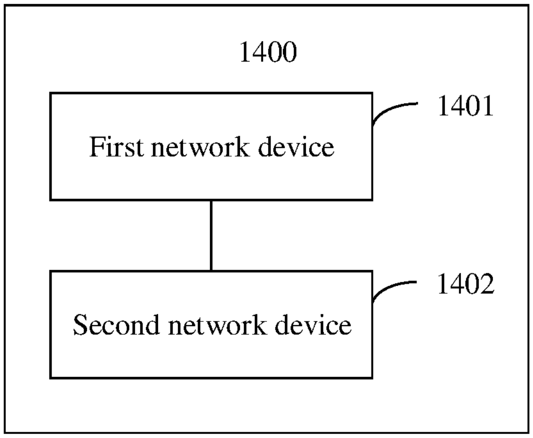
FIG. 14 is a schematic diagram of a structure of a packet processing system according to an embodiment of this application.

With reference to FIG. 14, an embodiment of this application provides a packet processing system 1400. The system 1400 includes the apparatus 800 shown in FIG. 8 and the apparatus 900 shown in FIG. 9, or the system 1400 includes the apparatus 1000 shown in FIG. 10 and the apparatus 1100 shown in FIG. 11, or the system 1400 includes the device 1000 shown in FIG. 10 and the device 1300 shown in FIG. 13.

The apparatus 800 shown in FIG. 8, the apparatus 1000 shown in FIG. 10, or the device 1000 shown in FIG. 10 is a first network device 1401. The apparatus 900 shown in FIG. 9, the apparatus 1100 shown in FIG. 11, or the device 1300 shown in FIG. 13 is a second network device 1402.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A network device, comprising:

at least one processor;

one or more memories coupled to the at least one processor and storing programming instructions that, when executed by the at least one processor, cause the network device to:

receive a first packet sent by a second network device, wherein the network device comprises a provider edge device (PE), the second network device comprises a first customer premises equipment (CPE) connected to a first source device, and the first packet comprises a first group identifier corresponding to a virtual private network (VPN) on the second network device, the first source device corresponds to the first packet and belongs to the VPN;

obtain a second group identifier based on a destination address of the first packet, wherein obtaining the second group identifier comprises performing a lookup in stored correspondence that maps a destination address to the second group identifier, and wherein the second group identifier corresponds to the VPN on a third network device, the third network device comprises a second CPE connected to a first destination device, the first destination device corresponds to the destination address of the first packet and belongs to the VPN, and the first destination device is connected to the third network device; and process the first packet based on the first group identifier and the second group identifier by determining, from stored correspondence information, a first processing policy for interconnection between the first and second CPEs, wherein the stored correspondence information correlates the first group identifier and the second group identifier with a processing policy.

2. The network device according to claim 1, wherein the programming instructions, when executed by the at least one processor, further cause the network device to:

obtain the first processing policy based on the first group identifier and the second group identifier; and process the first packet based on the first processing policy.

3. The network device according to claim 2, wherein the programming instructions, when executed by the at least one processor, further cause the network device to:

obtain the first processing policy based on the first group identifier, the second group identifier, and a first correspondence, wherein the first correspondence comprises the first group identifier, the second group identifier, and the first processing policy.

4. The network device according to claim 2, wherein the programming instructions, when executed by the at least one processor, further cause the network device to:

send the first packet to the third network device when the first processing policy indicates that a transmission direction from the second network device to the third network device is connected; or discard the first packet when the first processing policy indicates that the transmission direction from the second network device to the third network device is isolated.

5. The network device according to claim 4, wherein the first processing policy further indicates that a transmission direction from the third network device to the second network device is connected, or the first processing policy further indicates that the transmission direction from the third network device to the second network device is isolated.

6. The network device according to claim 1, wherein the programming instructions, when executed by the at least one processor, further cause the network device to:

obtain routing information used to send the first packet, wherein the routing information comprises an address of the third network device based on the destination address of the first packet; and obtain the second group identifier based on the address of the third network device, a network identifier of the VPN, and a second correspondence, wherein the second correspondence comprises the address of the third network device, the network identifier of the VPN, and the second group identifier.

7. The network device according to claim 1, wherein the first group identifier is comprised in an internet protocol version 6 (IPv6) extension header of the first packet.

8. The network device according to claim 7, wherein the first group identifier is comprised in an application-aware networking (APN) identifier of the IPv6 extension header.

9. The network device according to claim 1, wherein the programming instructions, when executed by the at least one processor, further cause the network device to:

receive a second packet sent by the second network device, wherein the second packet comprises a third group identifier corresponding to the VPN on the second network device, a second source device corresponding to the second packet belongs to the VPN, and the second source device is connected to the second network device;

obtain a fourth group identifier based on a destination address of the second packet, wherein the fourth group identifier corresponds to the VPN on a fourth network device, a second destination device corresponding to the destination address of the second packet belongs to the VPN, and the second destination device is connected to the fourth network device; and process the second packet based on the third group identifier and the fourth group identifier, wherein the processing of the first packet comprises sending the first packet to the third network device, and the processing of the second packet comprises discarding the second packet.

10. The network device according to claim 1, wherein the second network device comprises the first CPE connected to the first source device, and the third network device comprises the second CPE connected to the first destination device.

11. A network device, comprising:

at least one processor;

one or more memories coupled to the at least one processor and storing programming instructions that, when executed by the at least one processor, cause the network device to:

obtain a first packet from a first source device connected to a first customer premises equipment (CPE), wherein the network device is connected to the CPE, the first source device and the CPE belong to a virtual private network (VPN), and the first packet comprises a first group identifier corresponding to the VPN on the network device;

obtain a second group identifier based on a destination address of the first packet, wherein obtaining the second group identifier comprises performing a lookup in stored correspondence that maps the destination address to the second group identifier, the second group identifier corresponding to the VPN on another network device that is connected to a second CPE providing access to a destination device belonging to the VPN, determine, from stored correspondence information, a first processing policy for interconnection between the first CPE and the second CPE, wherein the stored correspondence information correlates the first group identifier and the second group identifier with a processing policy; and send the first packet to another network device based on the first processing policy, wherein the another network device corresponds to the VPN and is connected to a second CPE that provides access to a destination device belonging to the VPN.

12. The network device according to claim 11, wherein the programming instructions, when executed by the at least one processor, further cause the network device to:

obtain the first group identifier based on a network identifier of the VPN and a first correspondence, wherein the first correspondence comprises the network identifier of the VPN and the first group identifier.

13. The network device according to claim 12, wherein the first correspondence further comprises a first address, and the first address comprises one or more of:

a source address of the first packet or a destination address of the first packet; and the programming instructions, when executed by the at least one processor, further cause the network device to:

obtain the first group identifier based on the network identifier of the VPN, the first address, and the first correspondence.

14. The network device according to claim 12, wherein the network device comprises a first interface bound to the VPN, the first interface is connected to the first source device, and the programming instructions, when executed by the at least one processor, further cause the network device to:

receive a third packet sent by the first source device through the first interface; and obtain the first packet based on the third packet, wherein the first packet comprises the network identifier of the VPN.

15. The network device according to claim 11, further comprising a customer premises equipment (CPE).

16. The network device according to claim 11, wherein the other network device comprises a network-side edge device.

17. A packet processing system, comprising a first network device and a second network device, wherein the second network device is configured to:

obtain a first packet from a first source device connected to a first customer premises equipment (CPE), the first CPE being connected to the second network device, wherein the first source device and the first CPE belong to a virtual private network (VPN), and the first packet comprises a first group identifier corresponding to the VPN on the second network device; and send the first packet to the first network device;

wherein the first network device is configured to:

receive the first packet sent by the second network device;

obtain a second group identifier based on a destination address of the first packet, wherein obtaining the second group identifier comprises performing a lookup in stored correspondence that maps a destination address to the second group identifier, and wherein the second group identifier corresponds to the VPN on a third network device connected to a second CPE, the second CPE being connected to a first destination device corresponding to the destination address of the first packet, and the first destination device belongs to the VPN; and process the first packet based on the first group identifier and the second group identifier by determining, from stored correspondence information, a first processing policy for interconnection between the first and second CPEs, wherein the stored correspondence information correlates the first group identifier and the second group identifier with a processing policy.

18. The system according to claim 17, wherein the first network device is further configured to:

obtain the first processing policy based on the first group identifier and the second group identifier; and process the first packet based on the first processing policy.

19. The system according to claim 17, wherein the first group identifier is comprised in an internet protocol version 6 (IPv6) extension header of the first packet.

* * * * *